US011902924B2

(12) United States Patent
Abedini et al.

(10) Patent No.: US 11,902,924 B2
(45) Date of Patent: Feb. 13, 2024

(54) METHODS AND APPARATUS RELATED TO LINK ESTABLISHMENT IN A WIRELESS BACKHAUL NETWORK

(71) Applicant: QUALCOMM Incorporated, San Diego, CA (US)

(72) Inventors: Navid Abedini, Raritan, NJ (US); Karl Georg Hampel, Hoboken, NJ (US); Muhammad Nazmul Islam, Edison, NJ (US); Sundar Subramanian, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/993,543

(22) Filed: May 30, 2018

(65) Prior Publication Data

US 2018/0352524 A1    Dec. 6, 2018

Related U.S. Application Data

(60) Provisional application No. 62/514,705, filed on Jun. 2, 2017.

(51) Int. Cl.
*H04W 56/00* (2009.01)
*H04L 5/00* (2006.01)
*H04W 92/02* (2009.01)

(52) U.S. Cl.
CPC ......... *H04W 56/0015* (2013.01); *H04L 5/005* (2013.01); *H04L 5/0053* (2013.01); *H04W 56/001* (2013.01); *H04W 92/02* (2013.01)

(58) Field of Classification Search
CPC .... H04L 5/005; H04L 5/0053; H04W 56/001; H04W 56/0015; H04W 92/02
See application file for complete search history.

(56) References Cited

U.S. PATENT DOCUMENTS 9,130,697 B2 * 9/2015 Struhsaker ............ H04L 1/1825
9,473,981 B2   10/2016 Bhushan et al.
(Continued)

FOREIGN PATENT DOCUMENTS

CN   102804667 A   11/2012
CN   105308887 A   2/2016
(Continued)

OTHER PUBLICATIONS

International Search Report and Written Opinion—PCT/US2018/035358—ISA/EPO—dated Nov. 7, 2018.
(Continued)

*Primary Examiner* — Jason E Mattis
*Assistant Examiner* — Bao G Nguyen
(74) *Attorney, Agent, or Firm* — QUALCOMM IP DEPT.; Ke Liu

(57) ABSTRACT

Various aspects related to using cellular RATs and/or features thereof for backhauling purposes are described. In an aspect, a solution to enable synchronization and establishing links among the ANs using available RATs with minimum modifications is provided. In an aspect of the disclosure, a method, a computer-readable medium, and an apparatus for wireless communication are provided. The apparatus maybe a first AN, e.g., base station. The apparatus maybe configured to determine a synchronization schedule of at least one second AN based on received information indicating the synchronization schedule of the at least one second AN, and transmit information regarding the synchronization schedule of the at least one second AN to at least one of one or more neighboring ANs or one or more UEs.

36 Claims, 12 Drawing Sheets

(56) References Cited

U.S. PATENT DOCUMENTS

| | | | |
|---|---|---|---|
| 9,750,044 B2 | 8/2017 | Xu et al. | |
| 10,004,050 B2 | 6/2018 | Ryu et al. | |
| 2010/0260168 A1* | 10/2010 | Gheorghiu | H04W 56/0015 370/350 |
| 2013/0265992 A1* | 10/2013 | Deng | H04W 56/001 370/336 |
| 2014/0254715 A1* | 9/2014 | Bareev | H04B 7/10 375/296 |
| 2014/0269670 A1* | 9/2014 | Park | H04W 56/00 370/350 |
| 2015/0103819 A1* | 4/2015 | Fujishiro | H04W 56/0015 370/350 |
| 2015/0208332 A1* | 7/2015 | Baghel | H04W 48/16 370/255 |
| 2015/0257024 A1 | 9/2015 | Baid et al. | |
| 2015/0289219 A1* | 10/2015 | Kim | H04W 56/0005 370/350 |
| 2016/0112977 A1* | 4/2016 | Byun | H04W 72/082 370/350 |
| 2016/0165560 A1* | 6/2016 | Takeda | H04W 72/042 370/350 |
| 2016/0360463 A1* | 12/2016 | Kim | H04W 48/16 |
| 2017/0048810 A1* | 2/2017 | Sahlin | H04L 27/26 |
| 2017/0142741 A1* | 5/2017 | Kaur | H04W 76/19 |
| 2017/0303219 A1* | 10/2017 | Liu | H04L 5/0032 |
| 2017/0311188 A1* | 10/2017 | Sun | H04L 5/0096 |
| 2018/0035396 A1* | 2/2018 | Stirling-Gallacher | H04W 56/0005 |
| 2018/0279240 A1* | 9/2018 | Sheng | H04B 1/7083 |

FOREIGN PATENT DOCUMENTS

| | | |
|---|---|---|
| CN | 106797621 A | 5/2017 |
| WO | 2014182493 A1 | 11/2014 |
| WO | 2014189908 A2 | 11/2014 |
| WO | WO-2015179109 A1 | 11/2015 |
| WO | 2016054820 A1 | 4/2016 |
| WO | 2017034728 A1 | 3/2017 |
| WO | WO-2017074946 A1 | 5/2017 |
| WO | 2018031170 A1 | 2/2018 |

OTHER PUBLICATIONS

Partial International Search Report—PCT/US2018/035358—ISA/EPO—dated Sep. 6, 2018.
ZTE: "Discussion on the Standard Impacts for RIBS," 3GPP Draft; R3-140731, Discussion on the Standard Impacts for RIBS, 3rd Generation Partnership Project (3GPP), Mobile Competence Centre; 650, Route Des Lucioles; F-06921 Sophia-Antipolis Cedex; France, vol. RAN WG3, No. San Jose Del Cabo, Mexico; Mar. 31-Apr. 4, 2014, Mar. 30, 2014, XP050795422, 5 pages, Retrieved from the Internet: URL: http://www.3gpp.org/ftp/Meetings_3GPP_SYNC/RAN3/Docs/ [retrieved on Mar. 30, 2014].
Taiwan Search Report—TW107118899—TIPO—dated Jul. 20, 2021.
Taiwan Search Report—TW107118899—TIPO—dated Dec. 28, 2021.
Qualcomm: "Forward Compatibility Considerations on NR Integrated Access and Backhaul," 3GPP Draft, R1-167119, 3GPP TSG-RAN WG1 #86, 3rd Generation Partnership Project (3GPP), Mobile Competence Centre; 650, Route Des Lucioles; F-06921 Sophia-Antipolis Cedex; France, Aug. 22-Aug. 26, 2016, Aug. 13, 2016, XP051142525, pp. 1-6, Retrieved from the Internet: URL: http://www.3gpp.org/ftp/tsg_ran/WG1_RL1/TSGR1_86/Docs/ [retrieved on Aug. 13, 2016].
China Office Action issued in Application No. 202111350097.5, dated Sep. 21, 2023, 14 pages. Applicant provides CNIPA Office Action and Notes provided by CN counsel.

* cited by examiner

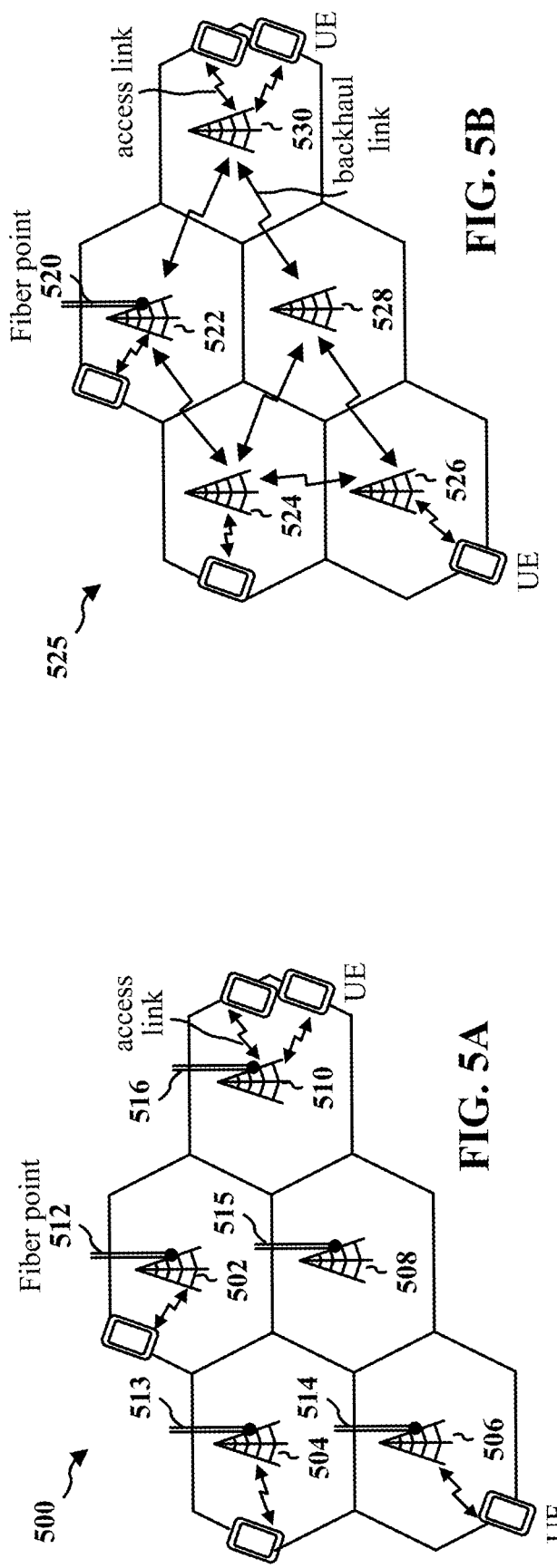
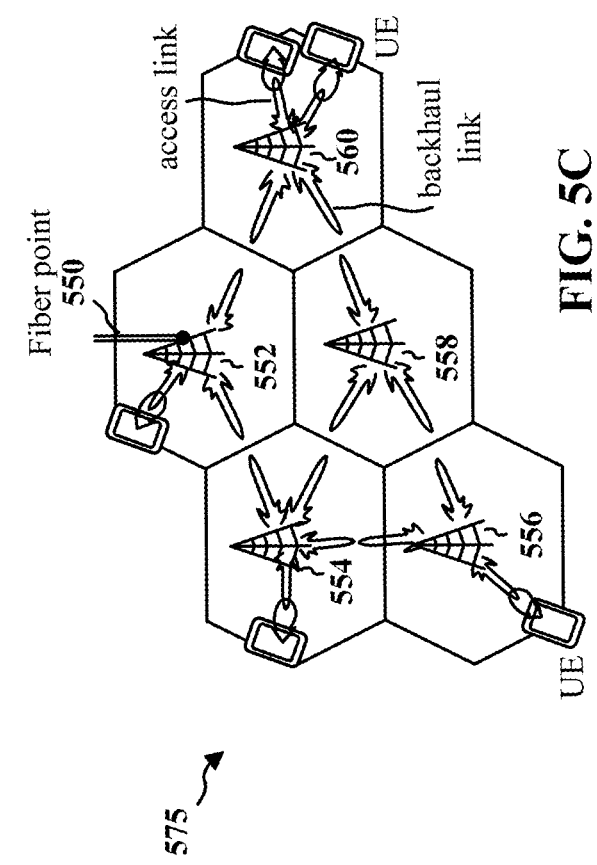
FIG. 5A
FIG. 5B
FIG. 5C

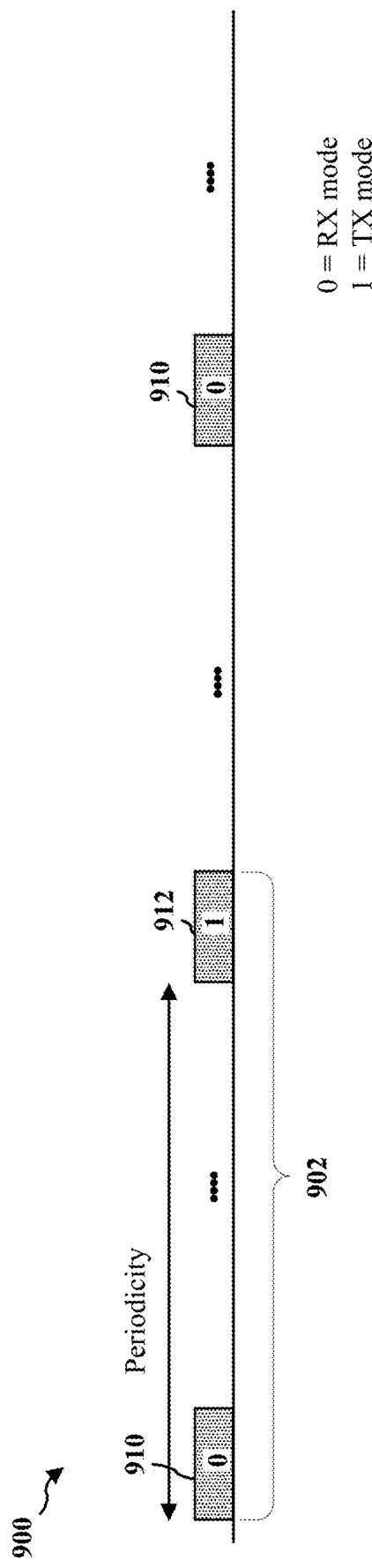

METHODS AND APPARATUS RELATED TO LINK ESTABLISHMENT IN A WIRELESS BACKHAUL NETWORK

CROSS-REFERENCE TO RELATED APPLICATION(S)

This application claims the benefit of U.S. Provisional Application Ser. No. 62/514,705 entitled "METHODS AND APPARATUS RELATED TO LINK ESTABLISHMENT IN A WIRELESS BACKHAUL NETWORK USING RADIO ACCESS TECHNOLOGY" filed on Jun. 2, 2017, which is expressly incorporated by reference herein in its entirety.

FIELD

The present disclosure relates generally to communication systems, and more particularly, to methods and apparatus supporting synchronization and link establishment in a wireless backhaul network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A hierarchical telecommunications network may have a hierarchical cell structure in which a larger cell (e.g., a macro cell) may be rearranged to include small cells (e.g., micro cells or pico cells). A micro/pico cell is allocated the radio spectrum to serve the increased population, e.g., increased number of mobiles nodes and/or other devices. In a hierarchical telecommunications network, the backhaul portion of the network includes the intermediate links between the core network, or backbone network and the small subnetworks at the "edge" of the entire hierarchical network. In such networks, reducing the cost of the backhaul network and increasing the flexibility of the backhaul network may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects related to using advanced cellular radio access technologies (RATs) and/or features thereof for backhauling purposes are described. Using cellular RATs such as millimeter wave (mmW) for backhauling purposes may allow access nodes (ANs) to self-backhaul access traffic to a suitable high-capacity fiber point. Further Integration of Access and Backhaul (IAB), e.g., shared resource utilization for access and backhauling, may permit resource-efficient spectrum utilization. In an aspect of the disclosure, a solution to enable synchronization and establishing links among the ANs using available RATs with minimum modifications is provided.

In an aspect of the disclosure, a method, a computer-readable medium, and an apparatus for wireless communication are provided. The apparatus may be a first access node (AN), e.g., a first base station. The apparatus may be configured to determine a synchronization schedule of at least one second AN based on received information regarding the synchronization schedule of the at least one second AN, and transmit the information regarding the synchronization schedule of the at least one second AN to at least one of one or more neighboring ANs or one or more user equipments (UEs).

In another aspect of the disclosure, a method, a computer-readable medium, and an apparatus for wireless communication are provided. The apparatus may be an belonging to a network of access nodes that includes one or more groups of ANs, and the apparatus may be a member of a first group of ANs. In one configuration, the apparatus may be configured to transmit, during a first set of synchronization resources, synchronization signals for downlink synchronization. The apparatus may be further configured to perform, during a second different set of synchronization resources, access node backhaul synchronization as part of the first access node group. In some configurations, as part of being configured to perform access node backhaul synchronization, the apparatus may be further configured to receive, at a first time interval, signals from one or more ANs included in a second different AN group of the network. In some configurations, the apparatus may be further configured to use the received signals from the one or more access nodes included in the second different AN group to update synchronization of the apparatus with the one or more ANs of the network. In some configurations, the apparatus may be further configured to transmit, at a second time interval, signals to ANs included in one or more other AN groups including the second access node group, where the transmitted signals may include synchronization information. In one configuration, the apparatus may be further configured to transmit information indicative of a schedule for synchronization transmission for one or more different ANs of the network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A shows an example of a wireless access network which supports access to UEs and where each AN is supported with a fiber backhaul.

FIG. 5B shows another example of a wireless access network which supports access to UEs and where ANs form a wireless backhaul network.

FIG. 5C illustrates an example of a wireless access network where mmW based RAT is used allowing narrow pencil beams to be used for access links and backhaul links.

FIG. 9A illustrates a first example showing periodically recurring synchronization resources that may be used by an access node for backhaul synchronization and further shows the state of the access node within each resource.

FIG. 9B illustrates a second example showing periodically recurring synchronization resources that may be used by an access node for backhaul synchronization and further shows different states of the access node within each resource.

DETAILED DESCRIPTION

Figure 1:
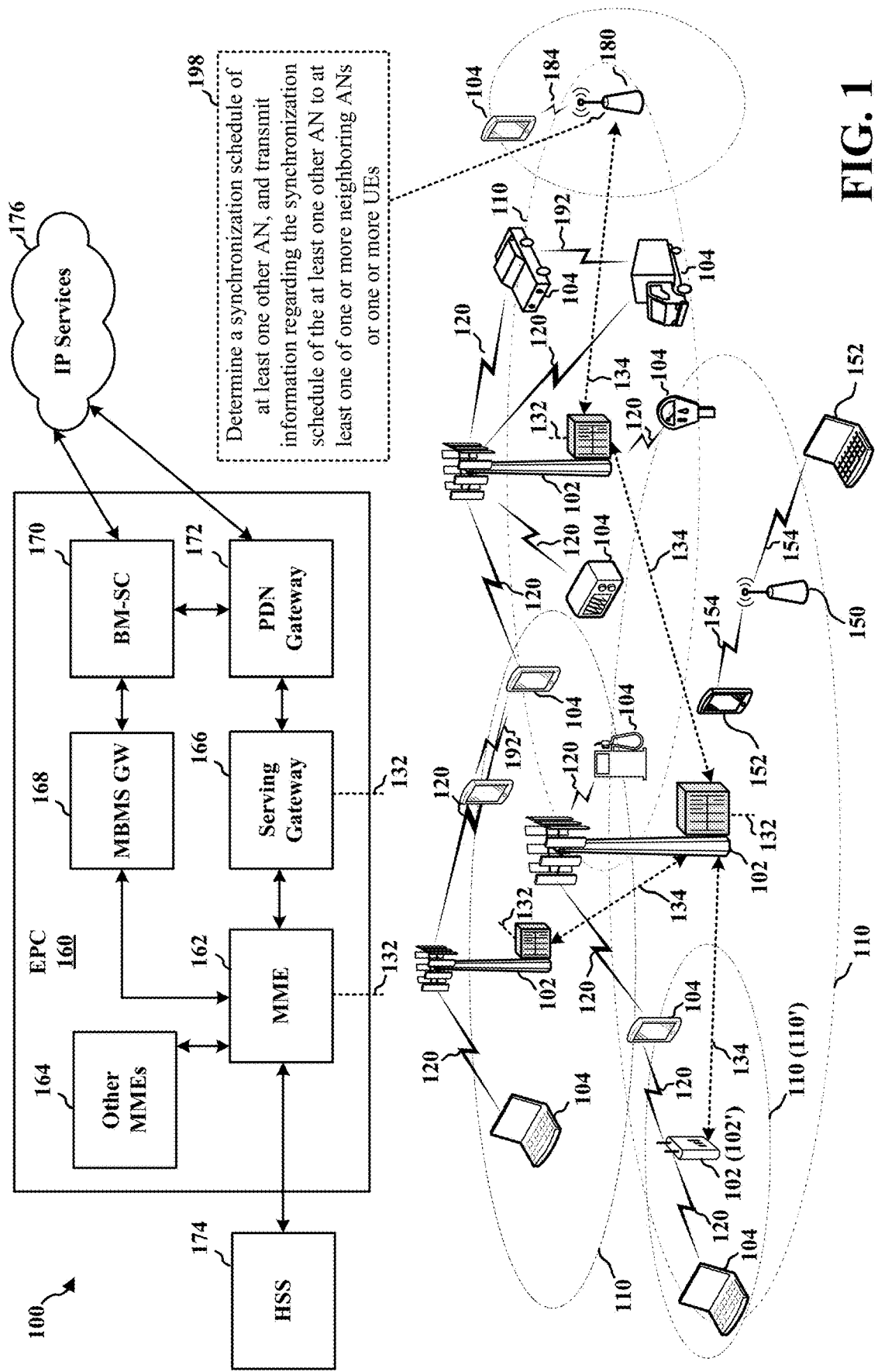
FIG. 1 is a diagram illustrating an example of a wireless communications system and an access network.
Figure 2:
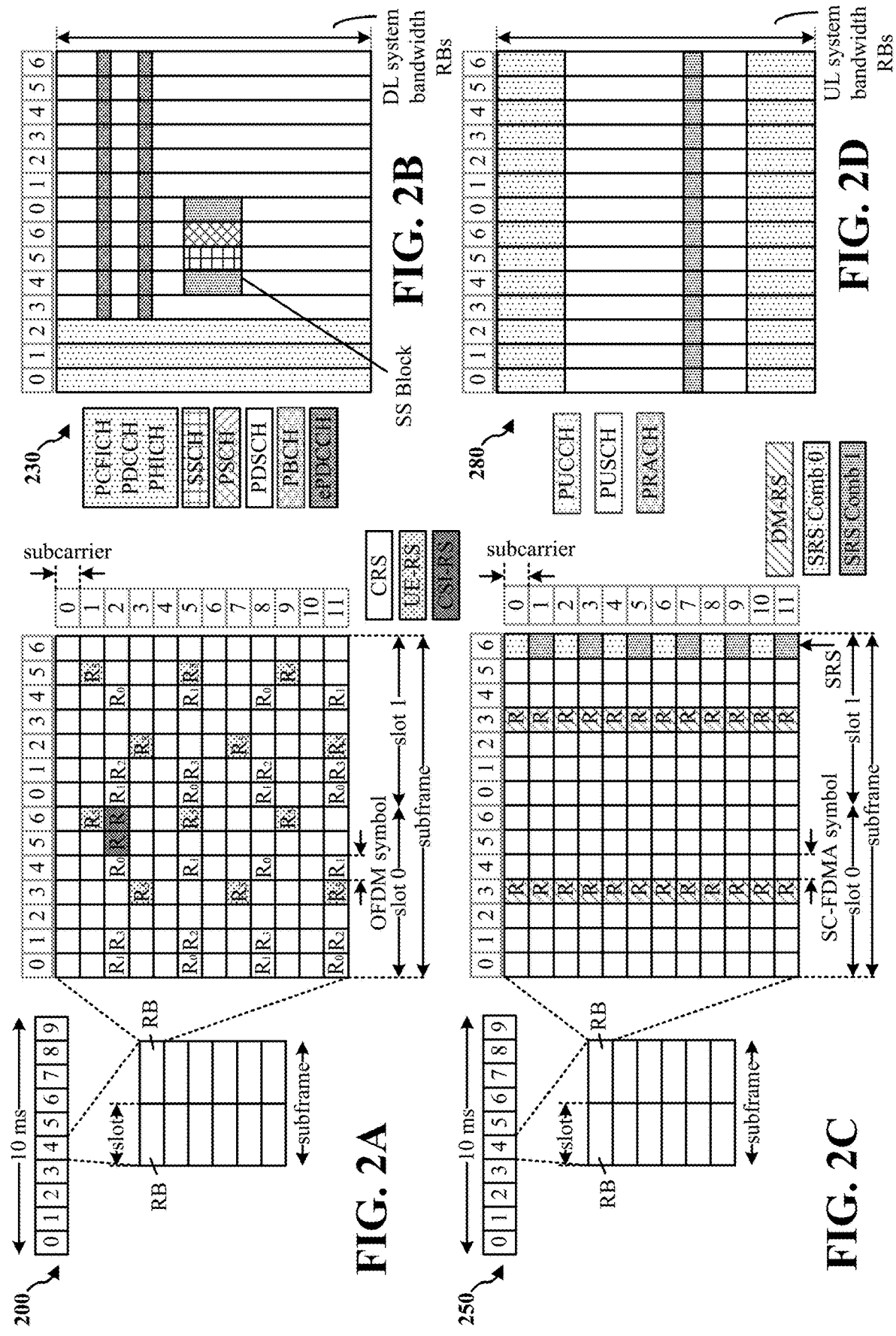
FIGS. 2A, 2B, 2C, and 2D are diagrams illustrating examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions:

transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, access node, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, an, e.g., the mmW base station 180, may determine a synchronization schedule of at least one other AN based on received information regarding the synchronization schedule of the at least one other AN, and transmit the information regarding the synchronization schedule of the at least one other AN to at least one of one or more neighboring ANs or one or more UEs (198). Various operations performed at 198 will be described below in more detail with reference to FIGS. 2-11.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
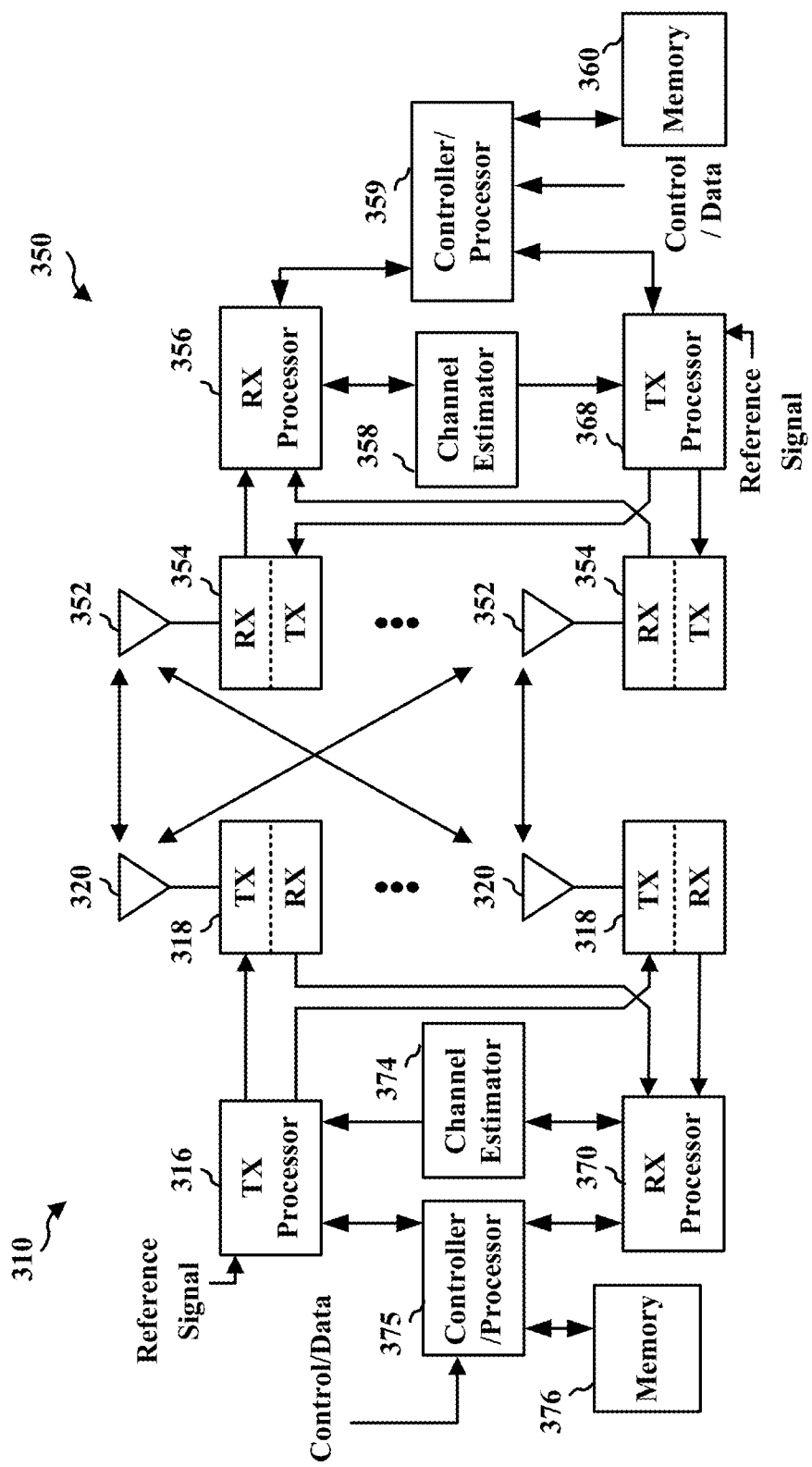
FIG. 3 is a diagram illustrating an example of an access node (e.g., base station) and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
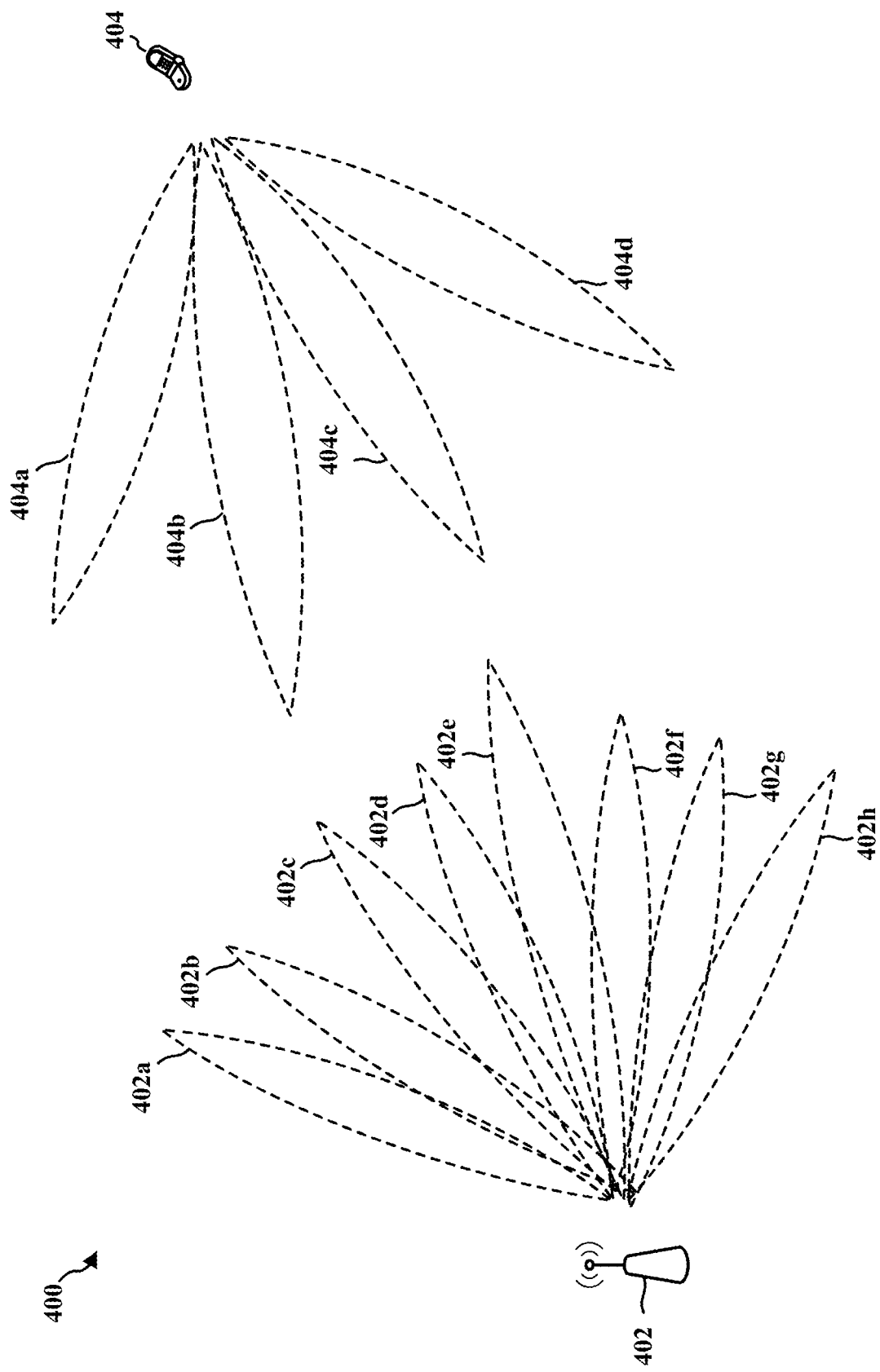
FIG. 4 is a diagram illustrating an access node (e.g., base station) in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

While the above discussion with reference to FIG. 4 focuses on beamformed communication between a base station, e.g., access node/point, and a UE, it should be appreciated that the same concept of beamformed communication may be applicable to communication between different base stations, e.g., where two access nodes may transmit and receive beamformed signals.

Cellular technologies such as mmWave (also sometimes referred to as mmW) may be used to support access traffic between UE and AN as well as for backhauling of access traffic among ANs. It may be further possible that access and backhauling share the same resources, which may be referred to as an Integrated Access/Backhaul (IAB) solution. The sharing of the same wireless channel/resources by both the access traffic and the backhauling of access traffic may be referred to as self-backhauling.

With the evolution of cellular technologies, such self-backhauling or IAB solutions may be promising due to the enhancements in wireless link capacity and reduction in latency. Further, self-backhauling may reduce the cost of dense small cells deployments.

FIG. 5A shows an example of a wireless access network 500 which supports access to UEs. In the illustrated example, each AN (also sometimes referred to herein as an AP), e.g., the ANs 502, 505, 506, 508, or 510, may be connected/coupled to a corresponding fiber point (e.g., the fiber point 512, 513, 514, 515, 516, respectively) to backhaul access traffic via the fiber point. Thus, in the access network of FIG. 5A every AN is supported with a fiber backhaul, e.g., there may be one fiber point per AN, and there may be no wireless backhaul network/link between the ANs in the example depicted in FIG. 5A.

FIG. 5B shows another example of a wireless access network 525 which supports access to UEs and where the ANs form a wireless backhaul network. In this example, one fiber point 520 is provisioned. For example, the AN 522 may be connected directly to the fiber point 520 to backhaul access traffic, while access traffic of ANs 524, 526, 528, and 530 may be exchanged with the fiber point 520 via a wireless backhaul network established (by the wireless backhaul links) among the ANs, e.g., ANs 522, 525, 526, 528, and 530.

Self-backhauling may be especially promising when using mmW-based radio technologies which apply very narrow antenna beams to reduce inter-link interference. Further, dynamic beam-steering and beam-search capabilities may be used to support discovery, link establishment and refinement in the presence of dynamic shadowing and Rayleigh fading.

FIG. 5C illustrates an example of a wireless access network 575 where a mmW based RAT may be used that allows narrow pencil beams to be used for access links and backhaul links. In this example, one fiber point 550 is provisioned. For example, the AN 552 may be connected/coupled directly to the fiber point 550 to backhaul access traffic via the fiber point 550 (e.g., to the core network or backbone network), while access traffic of ANs 554, 556, 558, and 560 may be exchanged with the fiber point 550 via a wireless backhaul network established among the ANs (e.g., the ANs 552, 554, 556, 558, and 560). Since the ANs may have larger antenna arrays compared to the UEs, the pencil beams of the ANs may be narrower.

One of the challenges of creating the wireless backhaul network for carrying access traffic of ANs without a fiber point and coordinating the resources among the ANs is the half-duplexing constraint, i.e., an cannot receive and transmit at the same time in the same frequency band. To coordinate timing of transmission and reception among the ANs, one possibility is to time synchronizing all links and impose a frame structure as supported by cellular RATs. As can be appreciated, achieving synchronization among ANs forming a backhaul network is desirable.

In cellular RATs, a UE may establish a link to an by first performing synchronization with the AN to align the UE's time and frequency with the AN and acquire system and AN information. The UE may then further transmit a random access channel (RACH) preamble to the AN to inform the AN about the UE's presence and request resources for further communications. In a mmW system, the UE and the AN may need to find the best beam pair (e.g., the beam pair with the best transmission quality and/or the least interference) for transmissions/receptions between the UE and the AN. The transmission and reception of synchronization signals and RACH signals may allow the best beam pair between the UE and the AN to be identified. In addition, a new reference signal (e.g., a beam reference signal (BRS)) may be used to facilitate the beam searching task.

In a wireless backhaul network, ANs may need to perform similar tasks to establish backhaul links with each other. It may be desirable to reuse the access network design and resources as much as possible with minimum disturbance to the access network performance. In the following discussion, one or more examples are provided on how the access network (downlink) synchronization design may be utilized to enable synchronization among ANs.

Figure 6:
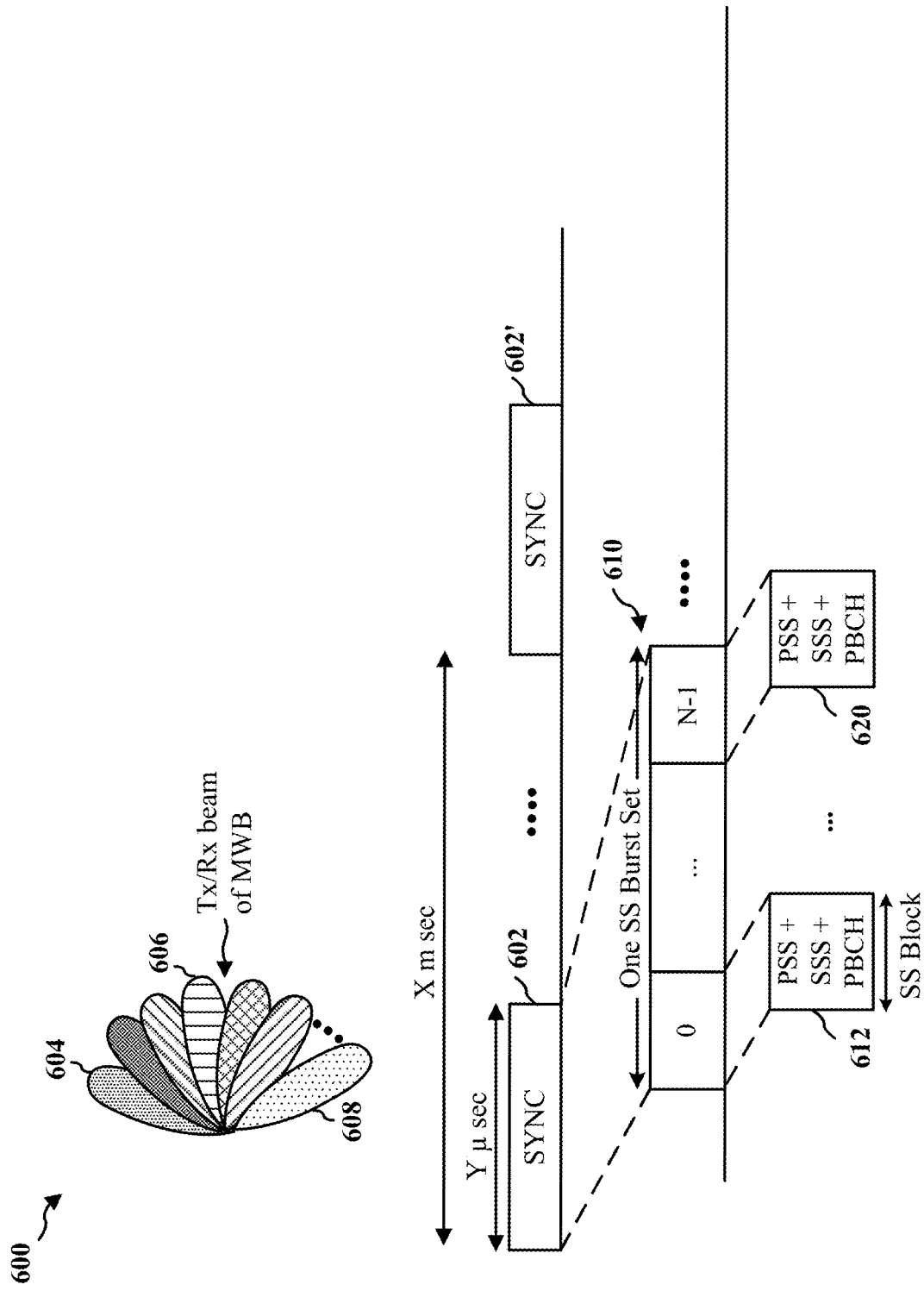
FIG. 6 illustrates an example of resource allocation for downlink synchronization in an access network that may use mmW based RAT for synchronization and link establishment among ANs.

FIG. 6 is a diagram 600 illustrating an example of resource allocation for downlink synchronization in an access network. The access network may be, e.g., a part of the access network of FIG. 1 and/or the access network illustrated in FIG. 5C that may use a mmW based RAT for synchronization and link establishment among ANs. In the access network, a number of resources may be periodically allocated for the downlink synchronization and various synchronization signals may be periodically transmitted by ANs on these periodic resources, e.g., synchronization resources. For example, the periodically recurring resources 602, 602' (shown as rectangular SYNC blocks in diagram 600) may be used for downlink synchronization. A synchronization signal (SS) burst set 610 may include multiple SS blocks (e.g., 612, . . . , 620) and may be transmitted on the synchronization resources. A synchronization signal block (SS block) may include multiple synchronization signals and channel, e.g., PSS, SSS, one or multiple PBCH symbols, and DM-RS for PBCH. The transmission of SS burst set 610 is periodic in some configurations, e.g., every X milli seconds (ms) and the duration of each SS burst set may be Y micro seconds (μsecs). In some configurations X=20 ms, and Y is ≤5 ms. In a mmWave system, the SS blocks (e.g., the signals within the SS blocks including the PSS and SSS) may be transmitted with different beam directions, e.g., during the SS burst set 604, to allow the UEs to find the best transmission/reception (Tx/Rx) beams to communicate with the ANs, e.g., eNBs. In some configurations, all the eNBs (ANs) participate in transmitting the synchronization signals to the UEs. Thus, in some configurations, the signals (corresponding to the SS block) described above may be transmitted multiple times in the same or different beam directions. For example, in one configuration each of the SS blocks of the SS burst set 610 may be transmitted with a different beam direction during the SS burst set to allow the UEs to find the best TX/RX beams for communication with the eNBs. In FIG. 6, each TX/RX beam direction (e.g., 604, 606, . . . , 608) of mmW band is illustrated with a different pattern. For example, the signals of the SS block 612 may be transmitted with beam direction 604, another subsequent SS block of the SS burst set 610 may be transmitted with beam direction 606, and the SS block 620 of the SS burst set 610 may be transmitted with beam direction 608.

Figure 7:
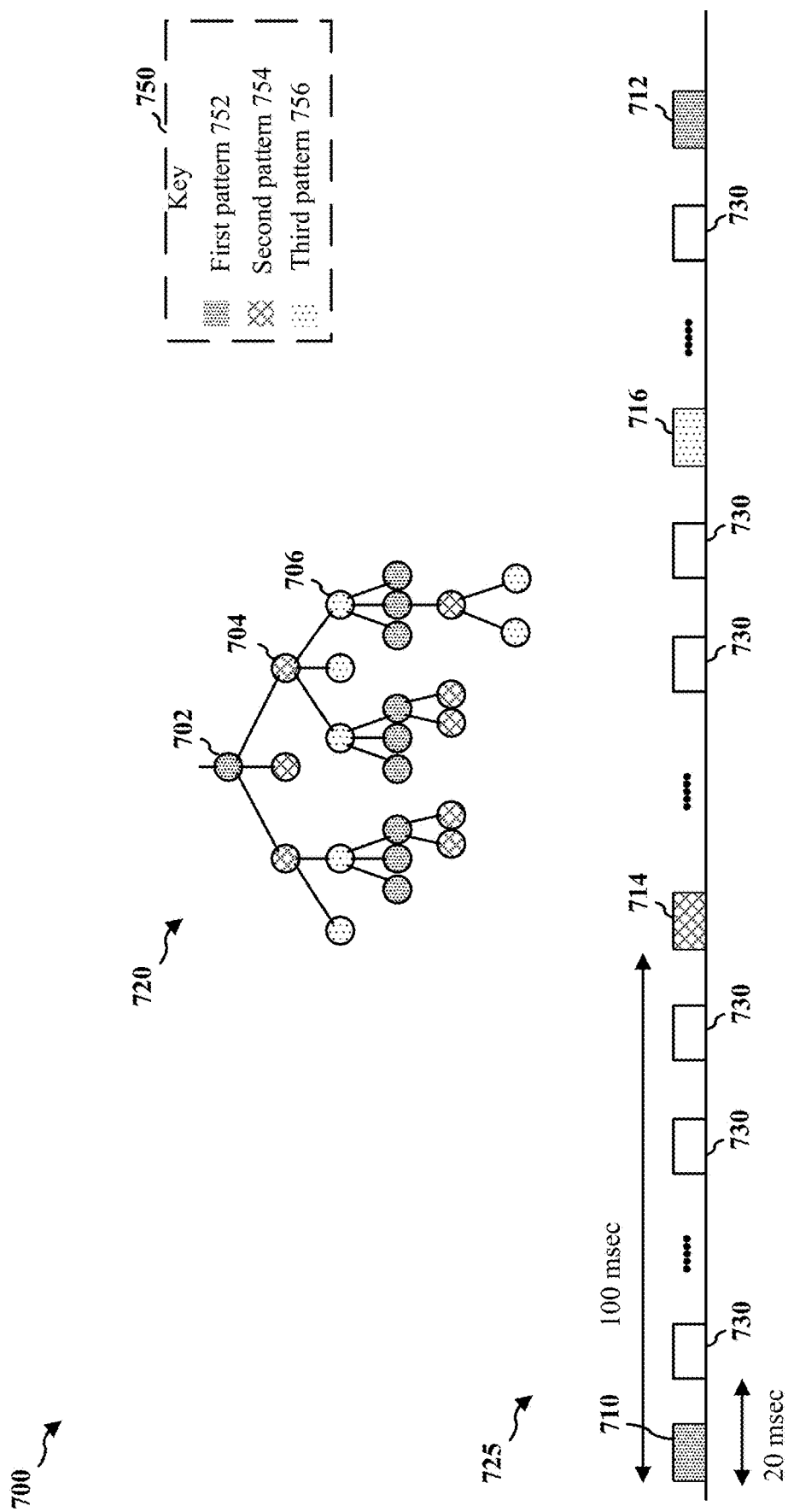
FIG. 7 is a diagram illustrating an example of using a color-code to determine when to switching from transmitting to listening to synchronization signals for each AN.

In one configuration, an may be configured to stop transmitting during a subset of synchronization resources (e.g., one or more SS burst sets or SS blocks within the SS burst sets) and instead listen to the incoming signals and attempt to synchronize to the AN's neighboring ANs, and thus overcome the half-duplex constraint. FIG. 7 is a diagram 700 illustrating an example showing use of a color-code to determine when to switch from transmitting synchronization signals to listening to synchronization signals from each AN. The diagram 700 includes an AN network tree 720 illustrating a network of ANs (e.g., with each node of the tree representing an AN of the network) and a diagram 725 illustrating SS burst sets that may be transmitted on corresponding synchronization resources, e.g., synchronization subframes. In one configuration, two ANs may be assigned two different colors (e.g., patterns) if the two ANs are directly linked in the tree 720. An SS burst set in the diagram 725 may be assigned a color (illustrated as a pattern) to indicate that during the given SS burst set the AN assigned with the same color (pattern) may operate in a manner/mode (e.g., for backhaul synchronization purposes) different than the normal downlink synchronization manner. For example, the ANs (including AN 702) represented by the nodes having the first pattern may switch from transmission of synchronization signals to listening for synchronization signals from other ANs in the SS blocks of the first SS burst set 710 (shown as having the same pattern as AN 702). Subsequently, the ANs (nodes having the first pattern as AN 702) may switch back to transmitting synchronization signals in other SS burst sets, and then again switch to listening to synchronization signals from other AN's in the SS blocks of the SS burst set 712 (which may be a periodic repetition of the SS burst set 710) with the same pattern as the AN 702.

In the AN network tree 720, each of the ANs is assigned one of 3 colors (illustrated with 3 patterns shown in box 750—first pattern 752, second pattern 754, and third pattern 756). Each AN decides when to ditch the AN's synchronization transmission based on the color (pattern) assigned to the AN. For example, the AN 702 may be assigned a first color (illustrated with a first pattern 752). In one configuration, the AN 702 (and other ANs with the same first pattern 752 as AN 702) may switch from transmission of synchronization signals to listening to synchronization signals during the SS burst sets 710 and 712, which are assigned the first pattern. In the other patterned SS burst sets, the AN 702 (and other ANs with the same first pattern as AN 702) may switch to transmission mode (to transmit synchronization signals) or another state/mode as discussed below. Similarly, the AN 704 may be assigned a second color (illustrated with a second pattern 754) and may switch from transmission (TX) to listening (RX) to synchronization signals during the SS burst set 714, which in the illustrated example is assigned/associated with the second pattern 754. The AN 706 may be assigned a third color (illustrated with a third pattern 756) and may switch from transmission (TX) to listening (RX) to synchronization signals during the SS burst set 716, which in the illustrated example is assigned/associated with the third pattern 756. The assignment of the patterns to the ANs may be by a central network entity, e.g., a core network node, or may be preconfigured at the ANs in some configurations.

In one configuration, the available SS burst sets (e.g., shown in diagram 725) may be divided into two sets of SS burst sets: a first set of SS burst sets (including the SS burst sets with solid white fill indicated by reference number 730) and a second set of SS burst sets (including the SS burst sets with different patterns 752, 754, 756). The available SS burst sets may correspond to (e.g., transmitted on) an available set of synchronization resources (e.g., within a downlink channel) and the first and second sets of the SS burst sets may correspond to a first and second set of resources within the available sets of synchronization resources. In one example, the available set of resources may be sets of synchronization resources, and the first and second sets may be first and second sets of synchronization resources. During the first set of SS burst sets (e.g., corresponding to a first set of synchronization resources, e.g., subframes), the synchronization transmission may follow the downlink synchronization design (e.g., all ANs transmit synchronization signals to allow the UEs of the access network to synchronize). During the second set of SS burst sets (e.g., the SS burst sets 710, 712, 714, 716), an AN may be in any of the following states/modes for backhaul synchronization (e.g., to allow the ANs of the backhaul network to synchronize): 1) Receive (RX) mode—synchronization signal reception from other ANs, e.g., to listen for synchronization signals from other ANs; 2) Transmit (TX) mode—for synchronization signal transmission with a potentially modified configuration (e.g., more suited for reception by neighboring ANs); 3) hybrid mode—AN switching between RX and TX mode during a single SS burst set, e.g., with the AN listening for synchronization signals in some SS blocks of a SS burst set and transmitting synchronization signals in some other SS blocks of the SS burst set; 4) Non-synchronization mode—AN may be involved in other non-synchronization related procedures, e.g., communications with other AN's or UEs via signals other than synchronization signals; or 5) Idle mode—AN is not involved in any procedure and remains silent, e.g., to conserve battery power. In one configuration, an AN may be in any of, or switch between, multiple states (e.g., RX mode, TX mode, hybrid mode, Non-synchronization mode or Idle mode) within the second set of SS burst sets. For example, in a subset of the second set of SS burst sets, the AN may be in RX mode; and in another subset of the second set of SS burst sets, the AN may be in TX mode (e.g., with modified transmission configuration to favor synchronization of other ANs), a hybrid mode, and so on.

In accordance with an aspect, while the downlink synchronization (with all ANs transmitting synchronization signals) may be reused as much as possible to reduce the negative effect (e.g., performance reduction) on the UEs, each AN may modify the AN's synchronization transmission configuration in a subset of resources (e.g., for transmitting synchronization signals in a subset of SS burst sets or SS blocks) to increase the backhaul synchronization. For example, the ANs may change the set of beams used for synchronization transmission by changing the elevation angle and/or the azimuth angles, e.g., to favor beamformed transmission of synchronization signals to other ANs to facilitate synchronization among AN's of a backhaul network. In another example, the ANs may change the signal waveforms or the resources used for the transmissions (e.g., transmitting synchronization signals in a wider bandwidth). In one configuration, the modified configuration for synchronization transmission may include any combination of: 1) a modified set of beams to be swept during the synchronization transmission (e.g., elevation angle may be modified towards other ANs, and/or the set of azimuth angles to be swept may be different from the azimuth angles used for downlink synchronization transmission); 2) modified constituent signals (e.g., PSS/SSS/PBCH) design and modified information carried by the constituent signals; or 3) modified resources allocated for the transmission (e.g., synchronization signals may be transmitted over a wider bandwidth).

In accordance with an aspect, a set of operational modes/states of the AN during the various SS burst sets may define the synchronization schedule of the AN, e.g., a pattern that the AN follows with regard to synchronization operations. For example, while during the first set of SS burst sets (SS burst sets with solid white fill indicated by reference number 730) all the ANs may follow the downlink synchronization design and transmit synchronization signals to facilitate synchronization by the UEs of the access network, during each SS burst set of the second set of SS burst sets (corresponding to each resource of the second set of synchronization resources) the AN 702 may be in any one of the above discussed modes. For instance during the first SS burst set 710 of the second set the AN 702 may be in RX mode, then during the next SS burst set (714) of the second set the AN 702 may be in the same (e.g., RX mode) or different mode, e.g., hybrid, TX mode with modified configurations, or another mode. Then during the SS burst set 712, the AN 702 may again be in the RX mode for listening to synchronization signals. Thus, each of the ANs of the AN network may have a synchronization schedule, e.g., pattern, with respect to the SS burst sets/synchronization resources. An access node may follow the AN's synchronization schedule to facilitate synchronization among neighboring ANs (backhaul synchronization) while avoiding potential limitations due to the half duplex constraint.

In one configuration, each AN in a wireless backhaul network may transmit some information to inform other ANs and UEs about the synchronization schedule of the AN. For example, an AN may transmit 1-bit of information to inform other ANs whether the AN is participating in backhaul synchronization. In case the AN follows a semi-persistent schedule for synchronization TX/RX, the AN may transmit some information (e.g., a few bits of information) from which the schedule can be inferred/identified (e.g., via an index to a preconfigured list of schedules). In one configuration, the index to a preconfigured list of schedules may be in the form a hop-count or a color-code. In one configuration, the communicated information (e.g., a few bits) from which the schedule can be inferred may be a random seed used to generate the schedule, e.g., pattern. In a more dynamic situation, where the AN changes its schedule, the AN may transmit some information (e.g., a few bits of information) to indicate the changes to the schedule (e.g., relative to a previous schedule) and specify the future state(s) of the AN. In one configuration, the information to inform other ANs and UEs about the synchronization schedule of the AN may be sent in any combination of MIB, SIB, RRC message.

In order to facilitate the neighbor cell search process, e.g., by UEs and/or neighboring ANs, an AN may inform the associated UEs and/or other ANs, about the synchronization schedule of other neighboring ANs (e.g., in addition to informing about the AN's own schedule). In one configuration, each AN in the wireless backhaul network may transmit some information to inform other ANs and/or UEs about the synchronization schedule of one or more other ANs, e.g., neighboring ANs. The information about the synchronization schedule of one or more other ANs may be received from the one or more other ANs (e.g., when the one or more other ANs transmit their schedules) and/or from a different set of ANs (which may be propagating neighbor AN schedules to others), and/or from a central network entity, and/or from one or more UEs. In a similar manner as discussed above with regard to an AN transmitting information about its own schedule, a first AN may transmit information regarding the synchronization schedule of at least one other AN, e.g., a second AN. For example, the first AN may transmit 1-bit of information to inform other ANs/UEs that at least one second AN (e.g., a neighboring AN of the first AN) is participating in backhaul synchronization. In case the at least one second AN follows a semi-persistent schedule for synchronization TX/RX, the first AN may transmit some information (e.g., a few bits of information) from which the schedule of the at least one second AN can be inferred/identified (e.g. via an index to a preconfigured list of schedules). In one configuration, the index to a preconfigured list of schedules may be in the form a hop-count or a color-code. In one configuration, the communicated information (e.g., a few bits) from which the schedule of the at least one second AN can be inferred may be a random seed used to generate the schedule, e.g., pattern. In a more dynamic situation, where the at least one second AN changes its schedule, the first AN may transmit some information (e.g., a few bits of information) to indicate the changes to the schedule of the at least one second AN (e.g., relative to a previous schedule) and specify the future state(s) of the at least one second AN. In one configuration, the information about the synchronization schedule of the at least one second AN may be sent by the first AN in any combination of MIB, SIB, RRC message.

In one configuration, an AN may decide the schedule of the AN (e.g., sequence of synchronization states/modes of the AN) based on different factors. For example, the schedule of the AN may be determined based on the information received from all or a subset of neighboring ANs (e.g., information received about the synchronization schedule of the neighboring ANs—whether received from a neighboring AN itself, or from a UE). In one configuration, the schedule of the AN may be determined based on the random seed used by the other ANs and/or the hop-count or color-code used by the other ANs. In one configuration, the schedule of the AN may be determined based on some preconfigured system parameters, and/or a network configuration from upper layers, and/or a random seed. For example, an AN may be initially configured to stop transmitting synchronization signals (e.g., for AN backhaul synchronization) on a set of SS burst sets, e.g., corresponding to a set resources, where the set of resources may be preconfigured. In one configuration, the preconfigured resources may depend in part on the cell identity (ID) of the AN. In some configurations, the upper layers of the AN may determine the schedule, e.g., based on measurement/determination of the state of the AN performed by the upper layer. In one configuration, an AN may change the schedule of the AN at any time based on the information received from all or a subset of other ANs (e.g., based on received information indicating schedule of neighboring ANs) and/or based on network configuration from upper layers.

In one configuration, in order to manage the synchronization schedules, a number of "network configuration nodes" may be defined in the wireless backhaul network. One of the role of the network configuration nodes may be to receive information from the ANs and/or UEs in the network, determine the synchronization schedules of the ANs (e.g., based on received information), and inform the ANs and/or UEs about the determined synchronization schedules. In one configuration, the ANs and/or UEs may report some information to the network configuration nodes. The reported information from an AN and/or a UE may include measurements (e.g., power and/or received signal quality measurements) and information the AN or the UE received from its neighboring ANs and/or UEs. The network configuration nodes may determine the synchronization schedule for all (or a subset) of ANs based on the information the network configuration nodes received, and transmit the synchronization schedule back to the ANs and/or UEs. Therefore, ANs may determine or modify their synchronization schedule (e.g., a previous synchronization schedule) based on the message(s) from one or more network configuration nodes.

Although the disclosure above focuses on the synchronization aspects of the link establishment procedure, similar approach may be applied to the RACH TX/RX process and beam reference signal (e.g. BRS) TX/RX process.

AN network tree 720 may be referred to as a network of access nodes. Each of the access nodes of AN network tree 720 can be assigned to an access node group; for example a first access node group designated with the first pattern 752, a second access node group designated with the second pattern 754, a third access node group designated with the third pattern 756, and so on, as explained above. A key 750 is provided to show various different fill patterns used in the example discussed with reference to FIG. 7. For an access node such as AN 702 that is a member of a first access node group (e.g., a member of the group shown with first pattern 742), the access node may transmit signals for downlink synchronization during a first set of synchronization resources, such as SS burst sets 730. The access node may perform access node backhaul synchronization as part of the first access node group during a second set of synchronization resources, designated by SS burst sets 710, 714, 716, and 712. As part of the access node backhaul synchronization, the access node 702 and other access nodes of the first access node group (e.g., those illustrated having the first fill pattern 752) may be configured to receive signals from one or more access nodes included in the second access node group (and possibly from different access node groups of the network of access nodes, such as the third access node group) during a first time interval of the second set of synchronization resources. The received signals can be used to update synchronization of the access node 702 with one or more of the other access nodes of the network of access nodes, as part of the backhaul synchronization.

In one configuration, during a different (second) time interval that is included in the second set of synchronization resources, the access node 702 (and other access nodes in the first access node group) may be configured to transmit (instead of remaining in the RX mode) signals including synchronization information to access nodes included in one or more other access node groups such as the second access node group, the third access node group, and/or additional access node groups that are not illustrated in FIG. 7. The transmission of signals during the second time interval corresponding to the second set of resources may be performed with modified transmission configuration. The modified transmission configuration may include, for example, 1) using modified set of beams during the synchronization transmission (e.g., elevation angle may be modified towards other ANs, and/or the set of azimuth angles to be swept may be different from the azimuth angles used for downlink synchronization transmission); 2) using modified constituent signals (e.g., PSS/SSS/PBCH) design and modified information carried by the constituent signals; and/or 3) modified resources allocated for the transmission (e.g., synchronization signals may be transmitted over a wider bandwidth. In some configurations, during the second time interval corresponding to the second set of synchronization resources, the access node 702 may be in any of the states/modes (e.g., RX mode, TX mode, hybrid mode, non-synchronization mode or idle mode). For example, if the AN 702 was in RX mode (listening for signals from other ANs and/or UEs) during the first time interval of the second set of resources; then during the second time interval of the second set of resources the AN 702 may be in TX mode (e.g., with modified transmission configuration to favor synchronization of other ANs), a hybrid mode, non-synchronization mode, or idle mode.

As mentioned elsewhere, the second set of synchronization resources may not all be used for the access node backhaul synchronization. For example, for a time interval included in the second set, the access node may be idle. In another example, for a time interval included in the second set, the access node may not be idle but may be performing procedures different than access node backhaul synchronization.

A number of different implementations may be used for the synchronization resources. For example, in some implementations the access node may both receive and transmit during one subframe of the second set of synchronization resources (e.g., the first time interval to receive signals and the second time interval to transmit signals may both be included in the same subframe). For example, with reference to FIG. 7 the second set of synchronization resources may correspond to the second set of SS burst sets 710, 712, 714, 716. In one example, the first time interval of the second set of synchronization resources may correspond to a first SS burst set (e.g., SS burst set 710) of the second set of SS burst sets, and the second time interval of the second set of synchronization resources may correspond to a second SS burst set (e.g., SS burst set 714). In another example, the first time interval of the second set of synchronization resources may correspond to a first set of SS blocks within a first SS burst set (e.g., SS burst set 710), and the second time interval of the second set of synchronization resources may correspond to a second set SS blocks within the first burst set 710. In another implementation, a plurality of subframes of the first set of synchronization resources may be between a subframe that includes a first time interval for receiving signals and a second time interval for transmitting signals.

The downlink synchronization and access node backhaul synchronization may use some common configurations and some different configurations. For example, transmission of synchronization signals during the first set of synchronization resources can use a first configuration (e.g., first elevation angle, first azimuth angle sweep pattern, first set of synchronization formats and information, first bandwidth, or other configuration parameters/elements). Transmission of synchronization signals during the second set of synchronization resources may, in some cases, use the same configuration to limit possible effects on UEs. However, using a configuration that is different in some way may be preferred in some instances. For example, the elevation angle may be changed to direct a beam toward one or more of the other access nodes in the network of access nodes for better execution of the access node backhaul synchronization. In other examples, the azimuth angle sweep pattern may be different, or the set of synchronization formats and information may be different (e.g., there may be one or more differences in PSS, SSS, ESS, PBCH or a combination).

Figure 8:
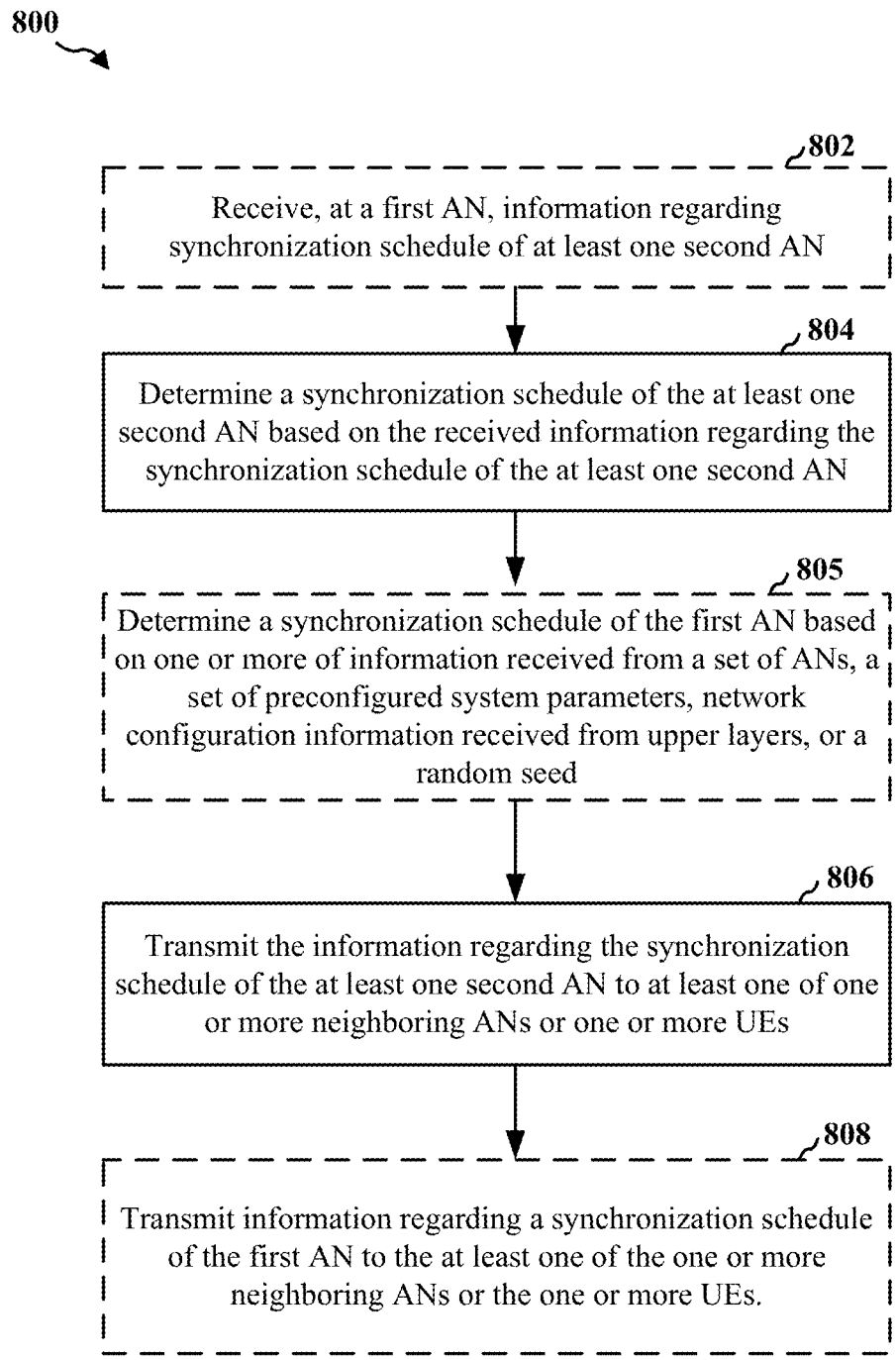
FIG. 8 is a flowchart of a method of wireless communication.

FIG. 8 is a flowchart 800 of a method of wireless communication. The method may be performed by a first mmW AN (e.g., the mmW base station 180, 310, 402, 552, 554, 556, 558, 560, 702, 704, 706, or the apparatus 1002/1002').

At 802, the first AN may receive information regarding synchronization schedule of the at least one other AN, e.g., a second AN. For example, with reference to FIG. 5, the AN 552 may receive information regarding the synchronization schedule(s) of one or more of the neighboring ANs 554, 556, 558, 560. In some configurations, the neighboring ANs of the first AN may be adjacent ANs (e.g., in adjacent cells) and/or ANs from which synchronization signal transmission may be heard. As another example, the first AN may be one the access nodes of a access node network (e.g., such as AN 702 in the AN network tree of drawing 700) that may receive information regarding the synchronization schedule(s) of one or more of the neighboring ANs (e.g., ANs 704, 706 etc.). In some configurations, the first AN may receive the information regarding the synchronization schedule of the at least one second AN from one of: the at least one second AN, a set of neighboring ANs, a core network node, or a UE.

At 804, the first AN may determine a synchronization schedule of the at least one second AN based on the received information regarding the synchronization schedule of the at least one second AN. In some configurations, the received information regarding the synchronization schedule of the at least one second AN may include information sufficient to infer the synchronization schedule of the at least one second AN even if the synchronization schedule is not explicitly described or communicated in the received information. For example, the first AN may be the AN 702 and the received information regarding the synchronization schedule of the at least one second AN (e.g., one or more of ANs 704, 706, and other ANs of the network) may include information (e.g., certain bits) indicating the synchronization schedule of the at least one second AN. In some aspects, the information indicating the synchronization schedule of the at least one second AN may include, for example, a random seed used by the at least one second AN to generate a pattern corresponding to the synchronization schedule. The random seed may be used to determine the synchronization schedule of the at least one second AN. In some configurations, the information indicating the synchronization schedule of the at least one second AN may be an index to a preconfigured list of synchronization schedules.

At 805, the first AN may determine a synchronization schedule of the first AN. The synchronization schedule of the first AN may be determined based on one or more of information received from a set of ANs (e.g., including the at least one second AN), a set of preconfigured system parameters, network configuration information received from upper layers, or a random seed. For example, the first AN (e.g., AN 552/702) may receive information, e.g., indicating synchronization schedule information of one or more other ANs from other ANs, e.g., base stations, and/or UEs in the network. The information indicating synchronization schedule of other ANs may be in the form of, e.g., rand seed, an index and/or in other form as discussed above. In one configuration, the information received from other ANs may include the color-codes used by the other ANs. The first AN may determine/update its synchronization schedule based on the received information. For example, in one configuration the first AN may select a different color-code in determining the synchronization schedule. In some other configurations, the resource schedule may be determined based on some preconfigured system parameters. For example, the first AN may be initially configured (preconfigured) to stop transmitting synchronization signals on some predetermined SS burst sets (e.g., corresponding to a predetermined set of resources) and operate in one or more of the above discussed modes (e.g., RX/hybrid mode) during the predetermined SS burst sets. In some configurations, the SS burst sets (and/or the synchronization resources that correspond to the SS burst sets) where the first AN is to listen for synchronization signals, may be preconfigured. In one configuration, the SS burst sets where the first AN is to listen for synchronization signals (e.g., operate in RX mode) may be determined based on the cell ID of the AN. In some configurations, the upper layers of the first AN may determine the synchronization schedule for the first AN. For example, the synchronization schedule of the first AN may be determined based on some measurements of the state of the first AN performed by the upper layers. In some configurations, the synchronization schedule may be determined based on a random seed. In some configurations, determining the synchronization schedule of the first AN may include changing the synchronization schedule of the first AN from a previous schedule to a different/updated synchronization schedule.

At 806, the first AN may transmit the information regarding the synchronization schedule of the at least one second AN to at least one of one or more neighboring ANs and/or one or more UEs. The UEs may include UEs associated with the first AN, e.g., the UEs of a cell served by the first AN, and/or UEs of one or more neighboring cells. In various configurations, an identity of the at least one second AN may also be communicated to identify the at least one second AN to which the information regarding the synchronization schedule corresponds. It should be appreciated that propagating information about the synchronization schedule of other neighboring ANs (in addition to informing about the first AN's own synchronization schedule), facilitates the neighbor cell search process. Thus, in some configurations, each AN in a wireless backhaul network may transmit some information to inform other ANs and/or UEs about the synchronization schedule of one or more other ANs.

In some configurations, the information regarding the synchronization schedule includes at least one of a single bit indicating that the at least one second AN is participating in backhaul synchronization in a backhaul network, a first set of bits indicating the synchronization schedule of the at least one second AN, or a second set of bits to indicate changes in the synchronization schedule and future states of the at least one second AN. In some configurations, the at least one second AN may follow a semi-persistent schedule, e.g., for transmitting/receiving its synchronization signals and/or for operating in different modes/states. In such a configuration, the first set of bits may communicate information from which the schedule can be inferred/identified. In some configurations, the first set of bits comprises a random seed that can be used to determine the synchronization schedule or an index to a preconfigured list of synchronization schedules. In some configurations, the index may be a hop-count or a color-code. For example, the first set of bits may communicate a hop count, e.g., between SS burst sets of the second set of SS burst sets, which may be mapped to one of a number of synchronization schedules known to the device (AN/UE) receiving the information regarding the synchronization schedule of the at least one second AN. Thus, from an indication of the hop count, the device receiving the information can determine the synchronization schedule of the at least one second AN. In another example where the first set of bits communicates a random seed, the device (AN/UE) receiving the information may use the received random seed and a random function to regenerate the synchronization schedule of the at least second UE. As discussed supra, in some configurations, the synchronization schedule of the at least second AN may indicate a set of modes/states of the at least one second AN during a set of SS burst sets, e.g., SS burst sets 710, 712, 714, 716 of the second set of SS burst sets shown in diagram 725. The set of SS burst sets may correspond to a set of synchronization resources, e.g., synchronization subframes, of a downlink channel. The set of modes/states of the at least one second AN includes one of a reception mode, a transmission mode, a hybrid mode, a non-synchronization mode, or an idle mode. Having the information regarding the synchronization schedule of other ANs (e.g., at least one second AN) may allow the receiving device (AN/UE) to better understand the operational modes/states of the at least one second AN in the context of synchronization, e.g., as to when the at least one second AN is transmitting/receiving synchronization signals during the second set of SS burst sets, and thus transmit/receive synchronization signals accordingly in order to facilitate synchronization among ANs and subsequent link establishment among the ANs.

In some configurations, the information regarding the synchronization schedule of the at least one second AN is transmitted by the first AN in one or more of a MIB, a SIB, or a RRC message.

At 808, the first AN may transmit information regarding a synchronization schedule of the first AN to the at least one of the one or more neighboring ANs or the one or more UEs. As discussed above (e.g., with regard to block 805 and elsewhere), in some configurations, the synchronization schedule of the first AN may be determined in a variety of ways. For example, the synchronization schedule of the first AN based on information received from other ANs, set of preconfigured system parameters, network configuration information received from upper layers, or a random seed.

While shown as different and sequential operations, it should be appreciated that the information regarding the synchronization schedule of the at least one second AN and the first AN may be transmitted in a single transmission in some configurations while separately in some other configurations. For example, in some configurations, the information regarding the synchronization schedule of the at least one second AN and the synchronization schedule of the first AN may be transmitted together in one or more of a MIB, a SIB), or an RRC message.

FIGS. 9A and 9B illustrate diagrams 900 and 950 of two specific example configurations of a set of synchronization resources 902 that may be used by an access node (e.g., AN 702) for backhaul synchronization. In various configurations, the resources in the set of synchronization resources 902 are different than the synchronization resources (e.g., such as resources 730) used for transmission of downlink transmission signals. FIG. 9A is diagram 900 illustrating a first example showing the set of synchronization resources 902 for backhaul synchronization including two resources (represented by blocks 910 and 912) which may periodically recur as indicated in the figure. In the illustrated examples, the first and second modes are indicated by "0" and "1" respectively. In the first example illustrated in diagram 900, the AN 702 to which the set of synchronization resources 902 correspond, may operate in a first mode during a time period corresponding to the first resource 910 and in a second different mode during a time period corresponding to the second resource 912. For example, "0" may indicate an RX mode of backhaul synchronization in which the AN 702 may listen for synchronization signals from other ANs, while "1" may indicate a TX mode of backhaul synchronization in which the AN 702 may transmit synchronization signals (e.g., with or without modified TX configuration) to other ANs in an access node network.

For example, with reference to FIG. 7, the first resource 910 may correspond to the SS burst set 710 and the second resource 912 may correspond to the SS burst set 712 and the set 902 may be the second set of synchronization resources corresponding to the AN 702. In the first example illustrated in diagram 900, the AN 702 may use the synchronization resource 910 for RX mode of backhaul synchronization, e.g., listen for synchronization signals from other ANs using the subcarriers and time period corresponding to resource 910. Furthermore, the AN 702 may use the synchronization resource 912 for TX mode of backhaul synchronization, e.g., transmit synchronization signals to other ANs using the subcarriers and time period corresponding to resource 912. As may be appreciated, in the first example illustrated in diagram 900, the state of the access node within a given resource remains the same. In accordance with an aspect, the set of synchronization resources 902 (resources 910 and 912) may recur periodically and the state of the access node within the resources 910 and 912 may recur periodically. In some configurations, each resource of the set of synchronization resources 902 may include a set of one or more consecutive subframes.

FIG. 9B illustrates a diagram 950 showing a second example in which the set of synchronization resources 902 for backhaul synchronization includes a resource (represented by block 910) which may periodically recur as indicated in the figure. In the second example, the set of AN 702 to which the set of synchronization resources 902 correspond, may operate in a first mode during a first half of the time period corresponding to the first resource 910 and in a second different mode during a second half of the time period corresponding to the second resource 912. Thus, in the second example illustrated in diagram 950, the AN 702 may switch between modes within the synchronization resource 910 which may recur periodically. In certain aspects, each synchronization resource 910 may comprise a plurality of different non-overlapping portions, and the AN 702 may operate in a different mode in each of the portions. For example, the resource 910 may include two consecutive subframes, and the AN 702 may operate in a different mode/state in each of the two subframes. For example, the AN 702 may be in the RX mode in a first subframe of the synchronization resource 910 and in the TX mode in a second subframe of the synchronization resource 910. In certain aspects, a state of the access node within each of a plurality of different portions of the resource may repeat periodically along with the resource 910 as illustrated. Thus, as may be appreciated, in the second example illustrated in diagram 950, the state of the access node within a given resource may change. In accordance with an aspect, the resource 910 may recur periodically and the pattern/schedule of the states of the access node within the resource 910 may repeat periodically as shown in the example. For example, the states within a resource may follow a pattern (e.g., 0 (RX), 1 (TX) assuming 2 states within a resource) and then the resource and the pattern within the resource may repeat periodically.

The information indicating the set of resources 902 corresponding to the given access node (e.g., AN 702), the duration of each resource, periodicity, state(s) within a resource, and similar information regarding the synchronization resources used for backhaul synchronization may define a synchronization schedule of the given access node. As discussed supra, and further discussed infra, an access node may transmit information indicative of its own synchronization schedule and optionally the synchronization schedule of one or more other ANs to other ANs.

Another exemplary method of wireless communication will now be discussed with reference to flowchart 1000 of FIG. 10. The method may be performed by an AN (e.g., the mmW base station 180, 310, 402, 552, 554, 556, 558, 560, 702, 704, 706, or the apparatus 1002/1002') which may be a part of a network of access nodes, e.g., such as AN network tree 720. For discussion purposes, the AN implementing the method of flowchart 1000 may be considered as the AN 702 which is part of the AN network 720. In accordance with an aspect, the ANs of the AN network tree 720 may be each assigned to one of the various different AN groups, e.g., a first access node group designated with the first pattern 752, a second access node group designated with the second pattern 754, a third access node group designated with the third pattern 756, and so on. In one configuration the ANs of a given AN group may follow the same synchronization schedule and different AN groups may follow different synchronization schedules.

At 1002, the AN (e.g., AN 702 that is a member of a first access node group shown with first pattern 752), may transmit signals for downlink synchronization during a first set of synchronization resources. For example, the AN 702 may transmit downlink synchronization signals, e.g., during SS burst sets 730. In one configuration, the signals for downlink synchronization transmitted during the first set of synchronization resources may be directed to UEs in the network. In some configurations, transmitting the synchronization signals for downlink synchronization during the first set of synchronization resources may comprise transmitting the synchronization signals in a first transmission configuration. In one configuration, the first transmission configuration may comprise a configuration of transmission beams with a first elevation angle and a first azimuth angle sweep pattern. In some configurations, the first transmission configuration may comprise a first transmission bandwidth.

At 1004, the AN may perform access node backhaul synchronization as part of the first access node group during a second set of synchronization resources. For example, with reference to FIG. 7 the second set of synchronization resources may be SS burst sets within the set of SS burst sets 710, 714, 716, and 712 corresponding to the AN, e.g., certain SS burst sets within which the given AN may deviate from regular downlink synchronization signal transmission mode to operate in a different mode (e.g., such as RX mode, hybrid mode, modified TX configuration mode, idle, etc.). For example, if the AN performing backhaul synchronization is AN 702, then the second set of resources may include the SS burst sets 710, 712. In some configurations, as part of the access node backhaul synchronization operation 1004, at 1005 the AN 702 and other access nodes of the first access node group (e.g., those illustrated having the first fill pattern 752) may receive signals from one or more access nodes included in the second access node group (and possibly from different access node groups of the network of ANs, such as the third access node group) during a first time interval of the second set of synchronization resources. For example, with reference to FIG. 7, in one configuration, the first time interval may correspond to a time period associated with a synchronization resource, e.g., SS burst set 710. In such an example, the AN 702 may receive signals from one or more access nodes (e.g., ANs 704, 706 etc.) included in the second access node group during the first time interval corresponding to SS burst 710. In another example, the first time interval may correspond to a portion of a time period associated with a synchronization resource. For example, with reference to FIG. 7, if the synchronization resource (e.g., SS burst 710) may comprise of one single subframe, then the first time interval may correspond to, e.g., a slot of the subframe or a time period corresponding to a set of OFDM symbols within the subframe. Similarly, with reference to FIG. 9B, in another example the first time interval may correspond to the first half portion of the synchronization resource 910 which may comprise of one or multiple subframes. In some configurations, at 1006, the AN may use the received signals can update synchronization of the AN 702 with one or more of the other ANs of the network of access nodes 720, as part of the backhaul synchronization.

As part of the access node backhaul synchronization operation, in some configurations, at 1007, during a second time interval corresponding to the second set of resources the AN 702 may transmit (instead of listening for synchronization signals in RX mode) signals including synchronization information to ANs included in one or more other access node groups such as the second access node group, the third access node group, and/or additional access node groups in the network. For example, with reference to FIG. 7, in one configuration, the second time interval may correspond to a time period associated with SS burst set 712 of the second set of resources. In such an example, while the AN 702 may be in an RX mode (listening for synchronization signals) during the first time interval corresponding to the second set of resources (e.g., corresponding to SS burst set 710), the AN 702 may switch to TX mode (e.g., with modified TX configuration) in the second time interval corresponding to the second set of resources, and transmit signals (e.g., synchronization signals) to one or more ANs (e.g., ANs 704, 706 etc.) included in one or more other access node groups during the second time interval corresponding to SS burst 712. In another example configuration, the second different set of synchronization resources may include a first subframe, and the first time interval and the second time interval correspond to the first subframe. For example, the second different set of synchronization resources may include the SS burst set 710 that may comprise a subframe. In one such example, the first time interval may correspond to e.g., a first slot of the subframe, and the second time interval may correspond to a second slot of the subframe. In yet another example, the second different set of synchronization resources may include multiple consecutive subframes, and the first time interval may correspond to a first group of subframes and the second time interval may correspond to a second group of subframes. In accordance with an aspect, the second set of synchronization resources may recur periodically (e.g., SS burst sets 710 and 712 may repeat periodically) and the pattern of operating modes of the AN 702 in which the AN operates during the second set of resources may periodically repeat as well. For example, the AN 702 may be in an RX mode during SS burst set 710 of the second set of synchronization resources while operate in a TX mode during SS burst set 712 of the second set of synchronization resources, and the pattern/schedule of the states of the AN 702 in second set of synchronization resources may also repeat with the periodic repetition of the SS burst sets 710 and 712, e.g., in the next subsequent periodic recurrence of SS burst set 712 the AN may be again in the TX mode. The same operation/process may also be understood with reference to the example illustrated in FIG. 9A.

In some configurations, the transmission of signals during the second time interval corresponding to the second set of resources may be performed with a second (e.g., modified) transmission configuration. The second transmission configuration may comprise a configuration of beams with a second elevation angle and a second azimuth angle sweep pattern. For example, in some configurations, the modified transmission configuration may include, for example, 1) using modified set of beams during the synchronization transmission (e.g., elevation angle may be modified towards other ANs, and/or the set of azimuth angles to be swept may be different from the azimuth angles used for downlink synchronization transmission); 2) using modified constituent signals (e.g., PSS/SSS/PBCH) design and modified information carried by the constituent signals; and/or 3) modified resources allocated for the transmission (e.g., synchronization signals may be transmitted over a wider bandwidth. In some configurations, the second transmission configuration may comprise a second transmission bandwidth that is greater than the first transmission bandwidth. While with reference to block 1007 the AN is described above as being in a modified TX configuration mode during the second time interval, in some configurations, during the second time interval corresponding to the second set of synchronization resources, the AN 702 may be in any of the states/modes (e.g., RX mode, TX mode, hybrid mode, non-synchronization mode or idle mode). Thus, in another example, during the second time interval corresponding to the second set of synchronization resources, the state/mode of the AN 702 may be e.g., an RX mode, TX mode, hybrid mode, non-synchronization mode, or idle mode. In accordance with one aspect, the second set of synchronization resources may not all be used for the access node backhaul synchronization. For example, for a time interval corresponding to the second set of resources, the AN may be idle (e.g., to conserve power and/or for other reasons), or but may be performing procedures different than backhaul synchronization. For example, in one configuration, during the a first portion of the second time interval (e.g., corresponding to SS burst 712), the AN 702 may be in TX mode and during the remaining portion of the second time interval the AN 702 may be in idle mode.

In some configurations, at 1008 the AN may transmit information indicative of a synchronization schedule of the AN, or the synchronization of at least one other different AN, e.g., one or more neighbor ANs, to other ANs and/or UEs in the network. For example, the AN 702 may transmit its own synchronization schedule and/or a synchronization schedule of at least one other different AN. In some configurations, the information indicative of synchronization schedule of the at least one other different AN may include information indicating that the at least one other AN is participating in backhaul synchronization in a backhaul network, information changes in the synchronization schedule and future states of the at least one other AN. In one configuration, the synchronization schedule of a given AN may indicate synchronization modes (e.g., synchronization TX mode, synchronization RX mode, another mode) of the given AN during a set of synchronization resources. In another configuration, the synchronization schedule may indicate various different modes (e.g., TX mode, RX mode, hybrid mode, non-synchronization mode, idle mode) in which the given AN may operate during a set of resources, e.g., such as a set of SS burst sets.

In one configuration, the information indicative of the synchronization schedule of the access node (e.g., AN 702) may comprise a first set of bits indicating the second different set of synchronization resources used for performing access node backhaul synchronization. For example, with reference to FIG. 7, the first set of bits (of the information indicative of the synchronization schedule of AN 702) may indicate the set including synchronization resources 710, 712 that may recur periodically. In one example, the information indicative of the synchronization schedule may indicate a duration/time period corresponding to each resource, periodicity, etc. In one configuration, the information indicative of the synchronization schedule of the access node may further comprise a set of bits indicating a state of the access node within each different resource of the second different set of synchronization resources. For example, with reference to FIG. 9A, the first set of bits (of the information indicative of the synchronization schedule of AN 702) may indicate the set of synchronization resources 902 including resources 910 and 912 that may recur periodically. Furthermore, a set of bits/bitmap in the transmitted information may further indicate a state of the AN 702 within each different resource (e.g., 910 and 912) of the set of synchronization resources 902. In some configurations, a state of the access node within a resource may remain the same. Furthermore, in some configurations, the state of the access node within the resource and the resource recurs periodically as illustrated in FIG. 9A.

In another example configuration, the information indicative of the synchronization schedule of the access node may comprise a bitmap indicating a state of the access node within each of a plurality of different portions of a resource of the second different set of synchronization resources recurring periodically. For example, with reference to FIG. 9B, the information indicative of the synchronization schedule of the AN 702 may comprise a bitmap indicating a state of the access node within each of the two different portions of the resource 910. In one such example, a first bit of the bitmap may indicate a first state of the access node within a first portion of the resource and a second bit of the bitmap may indicate a second state of the access node within a second portion of the resource, where the first and second portions of the resource may be non-overlapping. For example, with reference to FIG. 9B, a first bit of the bitmap may indicate that the AN 702 may operate in RX mode within a first half of a time period associated with resource 910 and a second bit of the bitmap may indicate that the AN 702 may operate in the TX mode within a second half of a time period associated with resource 910. The resource 910 and the indicated states of the access node in the resource 910 may recur periodically as illustrated in FIG. 9B and discussed supra.

In some configurations, the transmission of information indicative of synchronization schedule of the at least one other AN may be in addition to the transmission of information indicating the AN's own synchronization schedule. Thus, in some configurations, the AN 702 may transmit information indicative of a synchronization schedule of the at least one other different access node, e.g., a neighboring AN, to ANs in the network. In one configuration, the information indicative of the synchronization schedule of the at least one different access node may comprise a first set of bits indicating a third set of synchronization resources used by the at least one different access node for performing access node backhaul synchronization, where the third different set of synchronization resources may recur periodically. For example, the at least one other different AN may be the AN 704 and the third set of synchronization resources used by AN 704 for performing access node backhaul synchronization may comprise synchronization resource 714 (which recurs periodically in time). Thus, in such an example, the first set of bits indicating a third set of synchronization resources may indicate the synchronization resource 714 and optionally the associated periodicity. In some configurations, the information indicative of the synchronization schedule of the at least one different access node further comprises a bitmap indicating a state of the at least one different access node within each of a plurality of different portions of a resource of the third set of synchronization resources recurring periodically. As discussed supra, in some such examples, a first bit of the bitmap may indicate a first state of the at least one different access node within a first portion of the resource and a second bit of the bitmap may indicate a second state of the at least one different access node within a second portion of the resource, where the first and second portions of the resource may be non-overlapping.

In some configurations, the information indicative of the synchronization schedule of one or more different ANs may be transmitted in one or more of a MIB, a SIB, or via an RRC message.

Figure 11:
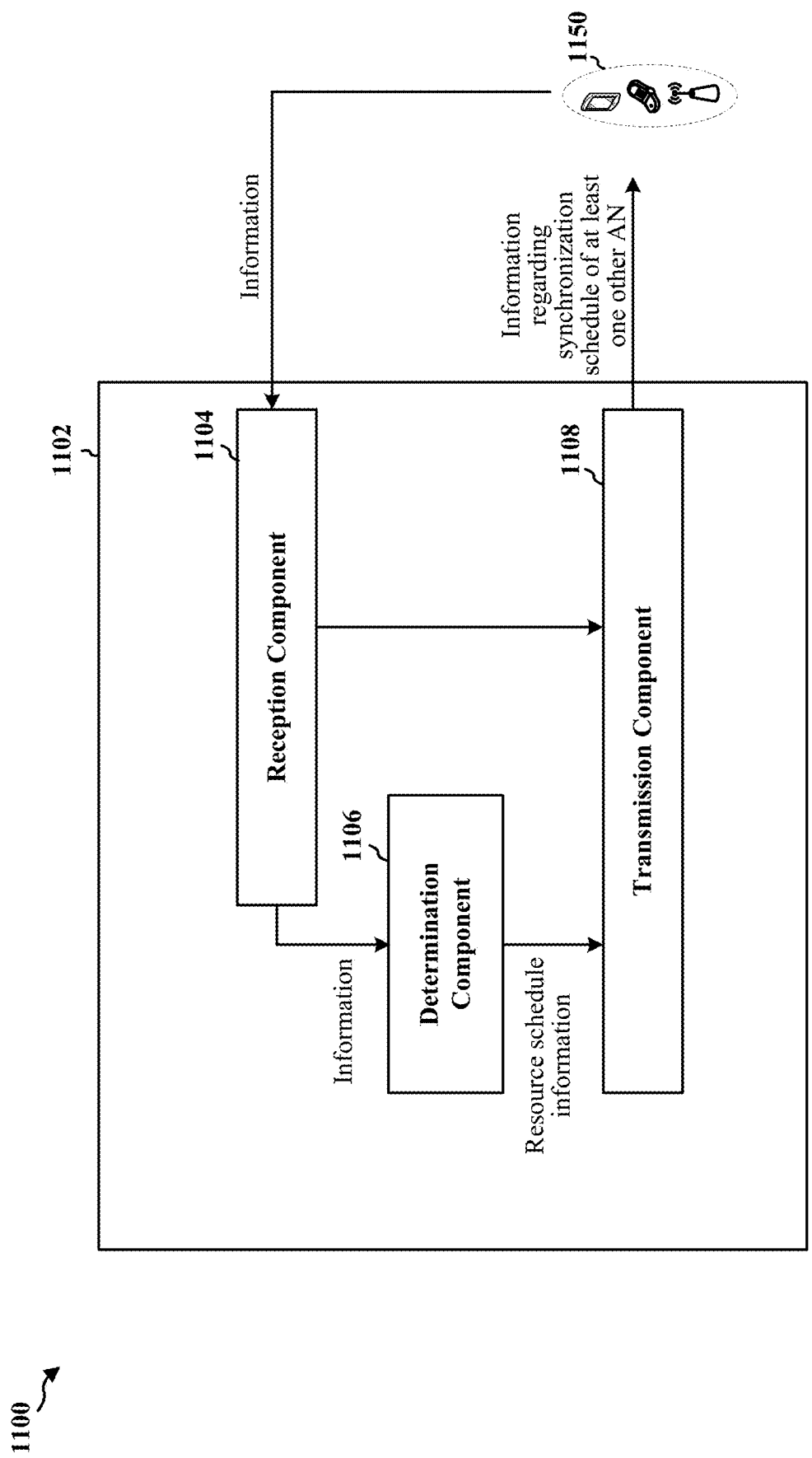
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a first AN, e.g., a base station such as the base station 180, 310, 402, 552, 554, 556, 558, 560, 702, 704, 706). The apparatus includes a reception component 1104, a determination component 1106, and a transmission component 1108.

The reception component 1104 may be configured to receive messages and/or information from other devices (e.g., ANs, UEs etc.) such as one or more devices collectively shown devices 1150, and/or from the core network nodes/configuration nodes of an access network. The reception component 1104 may be further configured to process the received information and forward the processed information for use by one or more other components of the apparatus. In some configurations, the reception component 1104 may be configured to receive information regarding the synchronization schedule of the at least one second AN. The information regarding the synchronization schedule of the at least one second AN may be received from one of the at least one second AN, a set of neighboring ANs, a core network node, or a UE. In some configurations, the reception component 1104 may be further configured to receive additional information, e.g., a system parameters, configuration information and/or other information that etc., from one or more core network nodes. In some configurations, the reception component 1104 may be further configured to receive information that can be used to determine the synchronization schedule of the first AN, where such information may include one or more of information received from a set of ANs, a set of preconfigured system parameters, network configuration information received from upper layers, or a random seed.

The determination component 1106 may be configured to determine a synchronization schedule of at least one second AN based on received information regarding the synchronization schedule of the at least one second AN. In some configurations, the determination component 1106 may be further configured to determine the synchronization schedule of the first AN based on one or more of information received from a set of ANs, a set of preconfigured system parameters, network configuration information received from upper layers, or a random seed. As discussed supra, the determination may be performed in various ways depending on the type of information (e.g., rand seed, index, system parameters etc.) based on which the determination is performed.

The transmission component 1108 may be configured to transmit the information regarding the synchronization schedule of the at least one second AN to at least one of one or more neighboring ANs or one or more UEs, e.g., such as one or more of the devices shown as devices 1150. For example, the transmission component 1108 may be configured to transmit information indicative of a synchronization schedule of one or more different ANs in an AN network (e.g., such as AN networks shown in FIG. 5 and FIG. 7). In some configurations, the information regarding the synchronization schedule includes at least one of a single bit indicating that the at least one second AN is participating in backhaul synchronization in a backhaul network, a first set of bits indicating the synchronization schedule of the at least one second AN, or a second set of bits to indicate changes in the synchronization schedule and future states of the at least one second AN. In some configurations, the first set of bits may comprise a random seed that can be used to determine the synchronization schedule or an index to a preconfigured list of synchronization schedules, and wherein the index comprises a hop-count or a color-code. In some configurations, the information regarding the synchronization schedule is transmitted in one or more of an MIB, an SIB, or an RRC message.

In one configuration, the apparatus 1102 may be a member of an AN group in an AN network where one or more such groups exist. For example, the apparatus 1102 may be a member AN (e.g., such as AN 702) of one of the groups of the AN network 720 illustrated in FIG. 7 and discussed above. In such a configuration, the transmission component 1108 may be configured to transmit signals for downlink synchronization during a first set of synchronization resources, e.g., during SS burst sets 730. In such a configuration, the determination component 1106 may be further configured to perform and/or control one or more backhaul synchronization operations. For example, the determination component 1106 may be configured to perform access node backhaul synchronization as part of the AN group (to which the apparatus 1102 belongs) during a second set of synchronization resources (e.g., one or more SS burst sets from the SS burst sets 710, 714, 716, and 712) that are different than the first set of synchronization resources (e.g., resources 730) used for downlink synchronization. In some configurations, as part of performing access node backhaul synchronization, the determination component 1106 may be configured to control the reception component 1104 to monitor for signals (e.g., synchronization signals) from other ANs, e.g., during a time period corresponding to one or more synchronization resources of the second set of synchronization resources.

In one configuration, the apparatus 1102 may be a member of a first AN group, and as part of the access node backhaul synchronization the reception component 1104 may receive signals from one or more ANs included in a second AN group (and possibly from other different AN groups of the network of ANs) during a first time interval of the second set of synchronization resources. In one such configuration, the determination component 1106 may be configured to use the received signals to update synchronization of the apparatus 1102 with one or more of the other ANs of the network of access nodes, as part of the backhaul synchronization operation. Furthermore, as part of the access node backhaul synchronization operation, in one configuration, the determination component 1106 may control the transmission component 1108 to transmit, during a second time interval corresponding to the second set of resources, signals including synchronization information to ANs included in one or more other AN groups in the network. The transmission of signals during the second time interval corresponding to the second set of resources may be performed with modified transmission configuration (as compared to the transmission configuration used during the first set of resources) as discussed previously in detail.

In some such configurations, the transmission component 1108 may be further configured to transmit information indicative of a synchronization schedule of at least one of the apparatus 1102 (e.g., AN 702) or at least one other different AN, e.g., a neighbor AN, to other ANs and/or UEs in the network. In one configuration, the information indicative of the synchronization schedule of the apparatus 1102 (e.g., AN 702) transmitted by transmission component 1108 may comprise a first set of bits indicating the second different set of synchronization resources used for performing access node backhaul synchronization. In one configuration, the information indicative of the synchronization schedule of the access node may further comprise a set of bits indicating a state of the apparatus 1102 within each different resource of the second different set of synchronization resources. Furthermore, a set of bits/bitmap in the transmitted information may further indicate a state of the apparatus 1102 within each different resource (e.g., 910 and 912) of the set of synchronization resources 902. In some configurations, a state of the access node within a resource may remain the same. Furthermore, in some configurations, the state of the access node within the resource and the resource recurs periodically as illustrated in FIG. 9A. In some configurations, the information indicative of the synchronization schedule of the apparatus 1102 transmitted by transmission component 1108 may comprise a bitmap indicating a state of the apparatus 1102 within each of a plurality of different portions of a resource of the second different set of synchronization resources recurring periodically. For example, with reference to FIG. 9B, the information indicative of the synchronization schedule of the apparatus 1102 may comprise a bitmap indicating a state of the access node within each of the two different portions of the resource 910. For example, a first bit of the bitmap may indicate a first state of the apparatus 1102 within a first portion of the resource, and a second bit of the bitmap may indicate a second state of the apparatus 1102 within a second portion of the resource, where the first and second portions of the resource may be non-overlapping, as discussed in more detail in the examples described supra.

In some configurations, the transmission component 1108 may be configured to transmit information indicative of synchronization schedule of the at least one other AN, in addition to the transmission of information indicating the synchronization schedule of the apparatus 1102. In one such configuration, the information indicative of the synchronization schedule of the at least one different access node transmitted by the transmission component 1108 may include a first set of bits indicating a third set of synchronization resources used by the at least one different access node for performing access node backhaul synchronization, where the third different set of synchronization resources may recur periodically. For example, the first set of bits may identify the third set of synchronization resources used by the at least one other AN for backhaul synchronization, and may also indicate the associated periodicity. In some configurations, the information indicative of the synchronization schedule of the at least one different access node may further comprise a bitmap indicating a state of the at least one different access node within each of a plurality of different portions of a resource of the third set of synchronization resources recurring periodically. As discussed supra, in some such examples, a first bit of the bitmap may indicate a first state of the at least one different access node within a first portion of the resource and a second bit of the bitmap may indicate a second state of the at least one different access node within a second portion of the resource, where the first and second portions of the resource may be non-overlapping.

In some configurations, the information indicative of synchronization schedule of the at least one other different AN may include, for example, information indicating that the at least one other AN is participating in backhaul synchronization in a backhaul network, information indicating changes in the synchronization schedule and future states of the at least one other AN.

In one configuration, the synchronization schedule of a given AN may indicate synchronization modes (e.g., synchronization TX mode or synchronization RX mode) of the given AN during a set of synchronization resources. In another configuration, the synchronization schedule may indicate various different modes (e.g., TX mode, RX mode, hybrid mode, non-synchronization mode, idle mode) in which the given AN may operate during a set of resources, e.g., set of SS burst sets. In some configurations, the information indicative of the synchronization schedule of the at least one other AN (e.g., one or more different ANs) may be transmitted in one or more of a MIB, a SIB, or via an RRC message.

Figure 10:
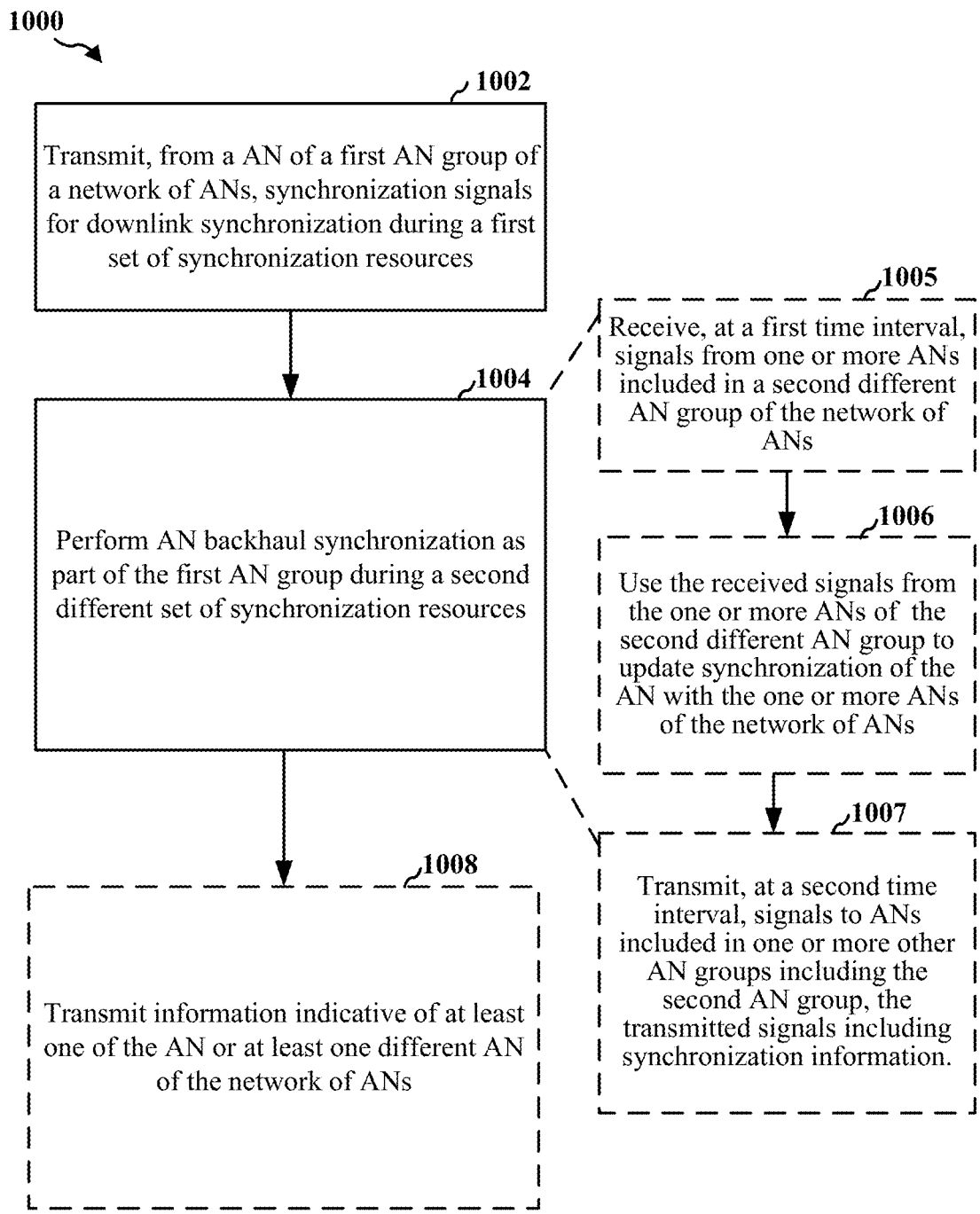
FIG. 10 is a flowchart of another method of wireless communication.

The apparatus may include additional components that perform each of the blocks of the algorithm in the aforementioned flowcharts of FIGS. 8 and 10. As such, each block in the aforementioned flowcharts of FIGS. 8 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
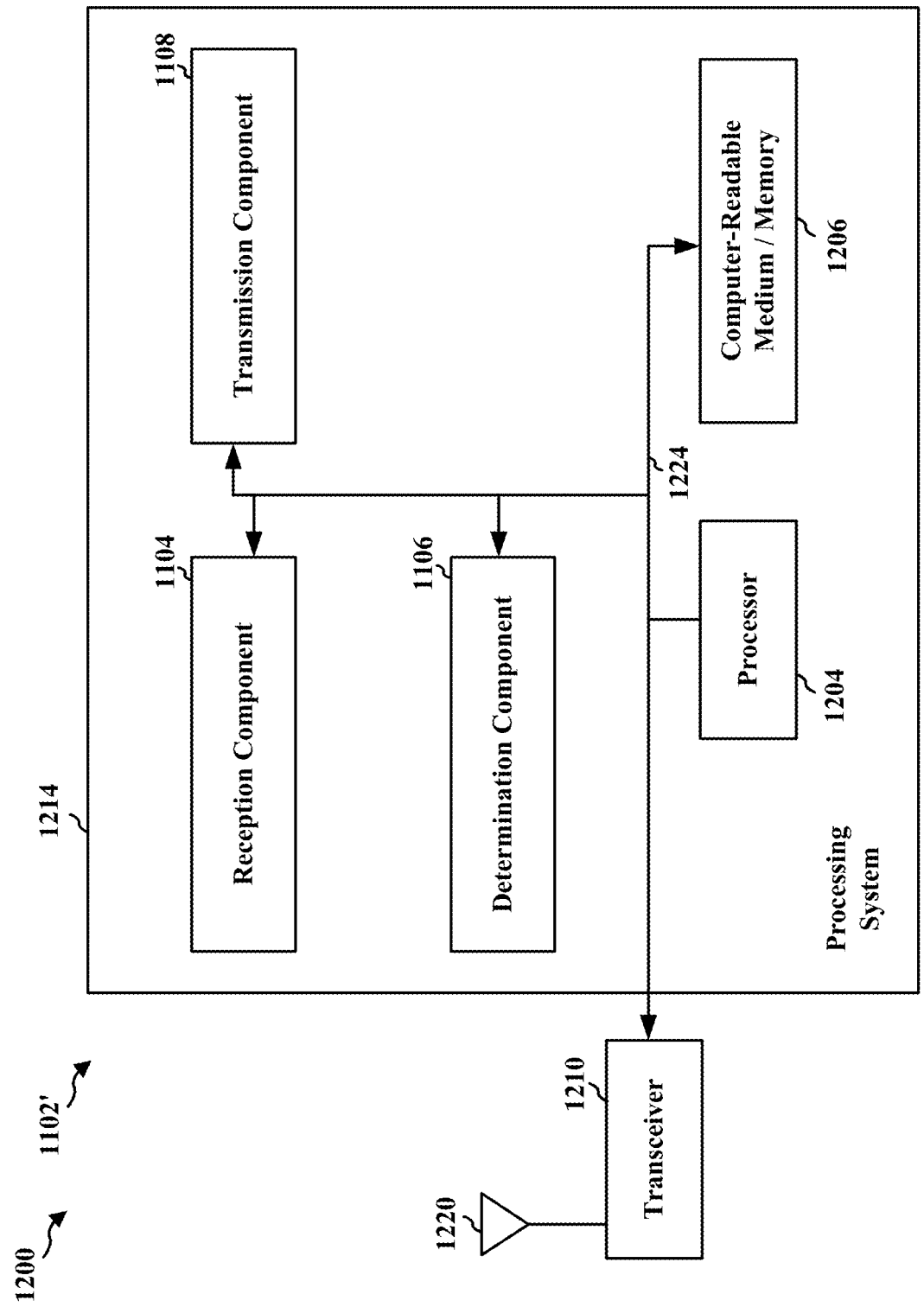
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 10004. In addition, the transceiver 1210 receives information from the processing system 1214, specifically the transmission component 1008, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1206, one or more hardware components coupled to the processor 1204, or some combination thereof. The processing system 1214 may be a component of the base station 311 and may include the memory 376 and/or at least one of the TX processor 316, the RX processor 370, and the controller/processor 375.

In one configuration, the apparatus 1102/1102' for wireless communication may be a first AN including means for receiving information regarding a synchronization schedule of the at least one second AN, e.g., from one of the at least one second AN, a set of neighboring ANs, a core network node, or a UE. In some configurations, the apparatus 1102/1102' further includes means for determining the synchronization schedule of at least one second AN based on the received information regarding the synchronization schedule of the at least one second AN. In some configurations, the apparatus 1102/1102' further includes means for transmitting the information regarding the synchronization schedule of the at least one second AN to at least one of one or more neighboring ANs or one or more UEs. In some configurations, the means for determining may be further configured to determine a synchronization schedule of the apparatus (e.g., the first AN) based on one or more of information received from a set of ANs, a set of preconfigured system parameters, network configuration information received from upper layers, or a random seed. In some configurations, the means for transmitting may be further configured to transmit information regarding the synchronization schedule of the first AN to the at least one of the one or more neighboring ANs or the one or more UEs.

In one configuration, the apparatus 1102/1102' may be a member of a first AN group in an AN network (e.g., AN network 720) where one or more such AN groups (e.g., first group, second group, third group etc.) exist. In one such configuration, the apparatus 1102/1102' for wireless communication may be include means for transmitting signals for downlink synchronization during a first set of synchronization resources. The apparatus 1102/1102' may further comprise means for performing AN backhaul synchronization during a second set of synchronization resources that are different than the first set of synchronization resources. In some configurations, the means for receiving may be further configured to receive signals from one or more access nodes included in a second AN group (and possibly from other different AN groups of the network of ANs)) during a first time interval of the second set of synchronization resources. In some configurations, as part of the backhaul synchronization the means for performing AN backhaul synchronization may be configured to use the received signals to update synchronization of the apparatus 1102/1102' with one or more of the other ANs of the network of ANs. In some configurations, the means for transmitting may be further configured to transmit signals including synchronization information to ANs included in one or more other AN groups such as the second access node group, the third access node group, and/or additional access node groups in the network. In some configurations, the means for transmitting may be configured to transmit signals during the second time interval corresponding to the second set of resources with the same transmission configuration as used for transmitting the signals for downlink synchronization during the first set of synchronization resources, or with a modified transmission configuration.

In some configurations, the means for transmitting may be further configured to transmit information indicative of a synchronization schedule of at least one of the apparatus 1102' (e.g., AN 702), or at least one other different AN, e.g., a neighbor AN, to other ANs and/or UEs in the network. In one configuration, the information indicative of the synchronization schedule of the apparatus (e.g., AN 702) may comprise a first set of bits indicating the second different set of synchronization resources used for performing access node backhaul synchronization. In one configuration, the information indicative of the synchronization schedule of the access node may further comprise a set of bits indicating a state of the access node within each different resource of the second different set of synchronization resources. In some configurations, a state of the access node within a resource may remain the same. Furthermore, in some configurations, the state of the access node within the resource and the resource may recur periodically. In one configuration, the information indicative of the synchronization schedule of the apparatus may comprise a bitmap indicating a state of the apparatus within each of a plurality of different portions of a resource of the second different set of synchronization resources recurring periodically. For example, a first bit of the bitmap may indicate a first state of the access node within a first portion of the resource and a second bit of the bitmap indicating a second state of the access node within a second portion of the resource, where the first and second portions of the resource may be non-overlapping.

In some configurations, the means for transmitting may be configured to transmit information indicative of a synchronization schedule of the at least one other different access node, e.g., a neighboring AN, to ANs in the network. In one configuration, the information indicative of the synchronization schedule of the at least one different access node may comprise a first set of bits indicating a third set of synchronization resources used by the at least one different access node for performing access node backhaul synchronization, where the third different set of synchronization resources may recur periodically. In some configurations, the information indicative of the synchronization schedule of the at least one different access node may further comprise a bitmap indicating a state of the at least one different access node within each of a plurality of different portions of a resource of the third set of synchronization resources recurring periodically. For example, a first bit of the bitmap may indicate a first state of the at least one different access node within a first portion of the resource and a second bit of the bitmap may indicate a second state of the at least one different access node within a second portion of the resource, where the first and second portions of the resource may be non-overlapping.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first access node (AN), comprising:
determining a synchronization schedule of at least one second AN based on received synchronization information regarding the synchronization schedule of the at least one second AN, the synchronization schedule of the at least one second AN indicating a pattern of synchronization operations associated with a first set of synchronization signal (SS) burst sets and a second set of SS burst sets, the first set of SS burst sets associated with facilitating synchronization with one or more user equipment (UEs) and the second set of SS burst sets associated with facilitating synchronization with one or more neighboring ANs,
wherein the first set of SS burst sets is associated with a first transmission configuration including at least one of a first set of beams, first constituent signals, and a first bandwidth allocation, and
the second set of SS burst sets is associated with a second transmission configuration including at least one of a second set of beams, second constituent signals, and a second bandwidth allocation,
the second transmission configuration being different from the first transmission configuration based on at least one of
the second set of beams comprising different beams than the first set of beams,
the second constituent signals comprising different signals than the first constituent signals, and
the second bandwidth allocation comprising a wider bandwidth allocation than the first bandwidth allocation; and
transmitting the synchronization information regarding the synchronization schedule of the at least one second AN to at least one of the one or more neighboring ANs or the one or more UEs.

2. The method of claim 1, wherein the synchronization information regarding the synchronization schedule includes at least one of a single bit indicating that the at least one second AN is participating in backhaul synchronization in a backhaul network, a first set of bits indicating the synchronization schedule of the at least one second AN, or a second set of bits to indicate changes in the synchronization schedule and future states of the at least one second AN.

3. The method of claim 2, wherein the first set of bits comprises a random seed that can be used to determine the synchronization schedule of the at least one second AN, or an index to a preconfigured list of synchronization schedules, and wherein the index comprises a hop-count or a color-code.

4. The method of claim 1, wherein the synchronization information regarding the synchronization schedule is transmitted in one or more of a master information block (MIB), a system information block (SIB), or a radio resource control (RRC) message.

5. The method of claim 1, wherein the first AN receives the synchronization information regarding the synchronization schedule of the at least one second AN from one of the at least one second AN, a set of neighboring ANs, a core network node, or a UE.

6. The method of claim 1, wherein the synchronization schedule of the at least one second AN indicates a set of modes of the at least one second AN during the second set of SS burst sets.

7. The method of claim 6, wherein the set of modes of the at least one second AN includes one of a reception mode, a transmission mode, a hybrid mode, a non-synchronization mode, or an idle mode.

8. The method of claim 1, further comprising:
transmitting information regarding a synchronization schedule of the first AN to at least one of the one or more neighboring ANs or the one or more UEs.

9. The method of claim 8, further comprising determining the synchronization schedule of the first AN based on one or more of information received from a set of ANs, a set of preconfigured system parameters, network configuration information received from upper layers, or a random seed.

10. The method of claim 9, wherein the information received from the set of ANs includes the synchronization information regarding the synchronization schedule of the at least one second AN.

11. A first access node (AN), comprising:
means for determining a synchronization schedule of at least one second AN based on received synchronization information regarding the synchronization schedule of the at least one second AN, the synchronization schedule of the at least one second AN indicating a pattern of synchronization operations associated with a first set of synchronization signal (SS) burst sets and a second set of SS burst sets, the first set of SS burst sets associated with facilitating synchronization with one or more user equipment (UEs) and the second set of SS burst sets associated with facilitating synchronization with one or more neighboring ANs,
  wherein the first set of SS burst sets is associated with a first transmission configuration including at least one of a first set of beams, first constituent signals, and a first bandwidth allocation, and
  the second set of SS burst sets is associated with a second transmission configuration including at least one of a second set of beams, second constituent signals, and a second bandwidth allocation,
  the second transmission configuration being different from the first transmission configuration based on at least one of
    the second set of beams comprising different beams than the first set of beams,
      the second constituent signals comprising different signals than the first constituent signals, and
      the second bandwidth allocation comprising a wider bandwidth allocation than the first bandwidth allocation; and
  means for transmitting the synchronization information regarding the synchronization schedule of the at least one second AN to at least one of the one or more neighboring ANs or the one or more UEs.

12. The first AN of claim 11, wherein the synchronization information regarding the synchronization schedule includes at least one of a single bit indicating that the at least one second AN is participating in backhaul synchronization in a backhaul network, a first set of bits indicating the synchronization schedule of the at least one second AN, or a second set of bits to indicate changes in the synchronization schedule and future states of the at least one second AN.

13. The first AN of claim 12, wherein the first set of bits comprises a random seed that can be used to determine the synchronization schedule or an index to a preconfigured list of synchronization schedules, and wherein the index comprises a hop-count or a color-code.

14. The first AN of claim 11, wherein the synchronization schedule of the at least one second AN indicates a set of modes of the at least one second AN during the second set of SS burst sets.

15. The first AN of claim 14, wherein the set of modes of the at least one second AN includes one of a reception mode, a transmission mode, a hybrid mode, a non-synchronization mode, or an idle mode.

16. The first AN of claim 11, wherein the means for transmitting is further configured to transmit information regarding a synchronization schedule of the first AN to at least one of the one or more neighboring ANs or the one or more UEs.

17. A first access node (AN) for wireless communication, comprising:
  a memory; and
  at least one processor coupled to the memory and configured to:
    determine a synchronization schedule of at least one second AN based on received synchronization information regarding the synchronization schedule of the at least one second AN, the synchronization schedule of the at least one second AN indicating a pattern of synchronization operations associated with a first set of synchronization signal (SS) burst sets and a second set of SS burst sets, the first set of SS burst sets associated with facilitating synchronization with one or more user equipment (UEs) and the second set of SS burst sets associated with facilitating synchronization with one or more neighboring ANs,
      wherein the first set of SS burst sets is associated with a first transmission configuration including at least one of a first set of beams, first constituent signals, and a first bandwidth allocation, and
      the second set of SS burst sets is associated with a second transmission configuration including at least one of a second set of beams, second constituent signals, and a second bandwidth allocation,
      the second transmission configuration being different from the first transmission configuration based on at least one of
        the second set of beams comprising different beams than the first set of beams,
        the second constituent signals comprising different signals than the first constituent signals, and
        the second bandwidth allocation comprising a wider bandwidth allocation than the first bandwidth allocation; and
    transmit the synchronization information regarding the synchronization schedule of the at least one second AN to at least one of the one or more neighboring ANs or the one or more UEs.

18. The first AN of claim 17, wherein the synchronization information regarding the synchronization schedule includes at least one of a single bit indicating that the at least one second AN is participating in backhaul synchronization in a backhaul network, a first set of bits indicating the synchronization schedule of the at least one second AN, or a second set of bits to indicate changes in the synchronization schedule and future states of the at least one second AN.

19. The first AN of claim 18, wherein the first set of bits comprises a random seed that can be used to determine the synchronization schedule or an index to a preconfigured list of synchronization schedules, and wherein the index comprises a hop-count or a color-code.

20. The first AN of claim 17, wherein the synchronization schedule of the at least one second AN indicates a set of modes of the at least one second AN during the second set of SS burst sets.

21. The first AN of claim 17, wherein the at least one processor is further configured to transmit information regarding a synchronization schedule of the first AN to at least one of the one or more neighboring ANs or the one or more UEs.

22. The first AN of claim 21, wherein the at least one processor is further configured to determine the synchronization schedule of the first AN based on one or more of information received from a set of ANs, a set of preconfigured system parameters, network configuration information received from upper layers, or a random seed.

23. A method of wireless communication at an access node, wherein the access node is a member of a first access node group of a network of access nodes, the method comprising:
  during a first set of synchronization resources, transmitting synchronization signals for downlink synchronization; and
  during a second different set of synchronization resources, performing access node backhaul synchronization as part of the first access node group, wherein performing the access node backhaul synchronization as part of the first access node group comprises:
  at a first time interval, receiving first signals from one or more access nodes included in a second different access node group of the network of access nodes;
  using the first signals from the one or more access nodes included in the second different access node group to update synchronization of the access node with the one or more access nodes of the network of access nodes; and
  at a second time interval, transmitting second signals to access nodes included in at least the second different access node group, the second signals including synchronization information,
    wherein transmitting the synchronization signals for the downlink synchronization is based on a first transmission configuration including at least one of a first set of beams, first constituent signals, and a first bandwidth allocation, and
    transmitting the second signals to the access nodes is based on a second transmission configuration including at least one of a second set of beams, second constituent signals, and a second bandwidth allocation,
    the second transmission configuration being different from the first transmission configuration based on at least one of
      the second set of beams comprising different beams than the first set of beams,
      the second constituent signals comprising different signals than the first constituent signals, and
      the second bandwidth allocation comprising a wider bandwidth allocation than the first bandwidth allocation.

24. The method of claim 23, wherein the second different set of synchronization resources includes a first subframe, and the first time interval and the second time interval are included in the first subframe.

25. The method of claim 23, wherein the first transmission configuration comprises a first configuration of transmission beams with a first elevation angle and a first azimuth angle sweep pattern, and the second transmission configuration comprises a second configuration of beams with a second elevation angle and a second azimuth angle sweep pattern, wherein the second elevation angle, the second azimuth angle sweep pattern, or both are different than the first elevation angle and the first azimuth angle sweep pattern.

26. The method of claim 23, wherein transmitting synchronization signals according to the second transmission configuration comprises transmitting a synchronization signal with at least one difference in one or more of a primary synchronization signal (PSS), secondary synchronization signal (SSS), extended service set (ESS), or physical broadcast channel (PBCH).

27. The method of claim 23, further comprising:
  transmitting synchronization information indicative of a synchronization schedule of at least one of the access node, or at least one different access node of the network of access nodes.

28. The method of claim 27, wherein the synchronization information indicative of the synchronization schedule of the access node comprises a first set of bits indicating the second different set of synchronization resources used for performing the access node backhaul synchronization, the second different set of synchronization resources recurring periodically.

29. The method of claim 28, wherein the synchronization information indicative of the synchronization schedule of the access node further comprises a bitmap indicating a state of the access node within each of a plurality of different portions of a resource of the second different set of synchronization resources recurring periodically, a first bit of the bitmap indicating a first state of the access node within a first portion of the resource and a second bit of the bitmap indicating a second state of the access node within a second portion of the resource, wherein the first portion and the second portion of the resource are non-overlapping.

30. The method of claim 29, wherein the resource comprises a set of one or more consecutive subframes, and wherein the first portion of the resource is the first time interval and the second portion of the resource is the second time interval.

31. The method of claim 28, wherein the synchronization information indicative of the synchronization schedule of the access node further comprises a set of bits indicating a state of the access node within each different resource of the second different set of synchronization resources.

32. The method of claim 31,
  wherein the state of the access node within a resource remains a same state;
  wherein the state of the access node within the resource and the resource recurs periodically; and
  wherein each resource of the second different set of synchronization resources includes a set of one or more consecutive subframes.

33. The method of claim 27, wherein the synchronization information indicative of the synchronization schedule of the at least one different access node comprises a first set of bits indicating a third set of synchronization resources used by the at least one different access node for performing the access node backhaul synchronization, the third set of synchronization resources recurring periodically.

34. The method of claim 33, wherein the synchronization information indicative of the synchronization schedule of the at least one different access node further comprises a bitmap indicating a state of the at least one different access node within each of a plurality of different portions of a resource of the third set of synchronization resources recurring periodically, a first bit of the bitmap indicating a first state of the at least one different access node within a first portion of the resource and a second bit of the bitmap indicating a second state of the at least one different access node within a second portion of the resource, wherein the first portion and the second portion of the resource are non-overlapping.

35. The method of claim 1, wherein the first transmission configuration includes a first combination of two or more of the first set of beams, the first constituent signals, and the first bandwidth allocation, and the second transmission configuration includes a second combination of two or more of the second set of beams, the second constituent signals, and the second bandwidth allocation.

36. The method of claim 1, wherein the first transmission configuration includes the first set of beams, the first constituent signals, and the first bandwidth allocation, and the second transmission configuration includes the second set of beams, the second constituent signals, and the second bandwidth allocation.

* * * * *